(12) United States Patent
Neumann et al.

(10) Patent No.: US 7,428,754 B2
(45) Date of Patent: Sep. 23, 2008

(54) SYSTEM FOR SECURE COMPUTING USING DEFENSE-IN-DEPTH ARCHITECTURE

(75) Inventors: William C. Neumann, Columbia, MD (US); Thomas E. Corby, Pasadena, MD (US); Gerald Allen Epps, Catonsville, MD (US)

(73) Assignee: The Mitre Corporation, McLean, VA (US)

( * ) Notice: Subject to any disclaimer, the term of this patent is extended or adjusted under 35 U.S.C. 154(b) by 796 days.

(21) Appl. No.: 10/919,361

(22) Filed: Aug. 17, 2004

(65) Prior Publication Data

US 2006/0041761 A1    Feb. 23, 2006

(51) Int. Cl.
G06F 15/16 (2006.01)
G06F 17/00 (2006.01)
G06F 9/00 (2006.01)

(52) U.S. Cl. .................................. 726/15; 380/280
(58) Field of Classification Search .................. 726/15
See application file for complete search history.

(56) References Cited

U.S. PATENT DOCUMENTS

| | | | |
|---|---|---|---|
| 5,201,049 A * | 4/1993 | Shorter | 718/1 |
| 5,850,449 A * | 12/1998 | McManis | 713/161 |
| 6,032,172 A * | 2/2000 | Kutcher | 718/102 |
| 6,263,437 B1 | 7/2001 | Liao et al. | |
| 6,353,891 B1 | 3/2002 | Borella et al. | |
| 6,374,286 B1 * | 4/2002 | Gee et al. | 718/108 |
| 6,438,690 B1 | 8/2002 | Patel et al. | |
| 6,446,204 B1 | 9/2002 | Pang et al. | |
| 6,453,352 B1 | 9/2002 | Wagner et al. | |
| 6,463,460 B1 | 10/2002 | Simonoff | |
| 6,463,534 B1 | 10/2002 | Geiger et al. | |
| 6,484,258 B1 | 11/2002 | Haverty | |
| 6,499,109 B1 | 12/2002 | Balasubramaniam et al. | |
| 6,499,110 B1 | 12/2002 | Moses et al. | |
| 6,510,513 B1 | 1/2003 | Danieli | |
| 6,523,027 B1 | 2/2003 | Underwood | |
| 6,535,227 B1 | 3/2003 | Fox et al. | |
| 6,539,093 B1 | 3/2003 | Asad et al. | |
| 6,539,480 B1 | 3/2003 | Drews | |
| 6,550,012 B1 | 4/2003 | Villa et al. | |
| 6,553,492 B1 | 4/2003 | Hosoe | |
| 6,567,920 B1 | 5/2003 | Cromer et al. | |
| 6,571,339 B1 | 5/2003 | Danneels et al. | |
| 6,594,763 B1 | 7/2003 | Madoukh | |
| 6,922,774 B2 * | 7/2005 | Meushaw et al. | 713/151 |
| 7,103,783 B1 * | 9/2006 | Friedman et al. | 726/15 |
| 7,134,123 B1 * | 11/2006 | Berry et al. | 718/1 |

(Continued)

OTHER PUBLICATIONS

Microsoft Windows 2000 Server, "Virtual Private Networking with Windows 2000: Deploying Remote Access VPNs," Publication date: Jul. 2002.*

(Continued)

*Primary Examiner*—Kambiz Zand
*Assistant Examiner*—Dant B Shaifer Harriman
(74) *Attorney, Agent, or Firm*—Rosenberg, Klein & Lee

(57) ABSTRACT

A secure computing system is provided which utilizes a unique combination of Public Key Infrastructure (PKI), Virtual Private Networking (VPN), and server-based computing on thin client devices. The combination of technology and components provide secure computing through Defense-in-Depth using commercial off-the-shelf components.

50 Claims, 14 Drawing Sheets

U.S. PATENT DOCUMENTS

| | | | |
|---|---|---|---|
| 2002/0023214 | A1 | 2/2002 | Shear et al. |
| 2002/0040434 | A1 | 4/2002 | Elliston et al. |
| 2002/0069114 | A1 | 6/2002 | Charette et al. |
| 2002/0095568 | A1 | 7/2002 | Norris et al. |
| 2002/0135611 | A1* | 9/2002 | Deosaran et al. ............ 345/738 |
| 2002/0169987 | A1 | 11/2002 | Meushaw et al. |
| 2002/0174342 | A1 | 11/2002 | Freeman et al. |
| 2003/0088780 | A1 | 5/2003 | Kuo et al. |
| 2003/0200447 | A1* | 10/2003 | Sjoblom ..................... 713/186 |
| 2006/0171402 | A1* | 8/2006 | Moore et al. ................ 370/401 |

OTHER PUBLICATIONS

"Administrator's Guide: Citrix ICA Win32 Clients, Version 7.0", Citrix Systems, Inc., 2003.

Simpson, W., "The Point-to-Point Protocol (PPP)", Network Working Group, RFC 1661, Jul. 1994.

Blunk, L., et al., "PPP Extensible Authentication Protocol (EAP)", Network Working Group, RFC 2284, Mar. 1998.

Kent, S., et al., "Security Architecture for the Internet Protocol", Network Working Group, RFC 2401, Nov. 1998.

Harkins, D., et al., "The Internet Key Exchange (IKE)", Network Working Group, RFC 2409, Nov. 1998.

Housley, R., et al., "Internet X.509 Public Key Infrastructure Certificate and CRL Profile", Network Working Group, RFC 2459, Jan. 1999.

Townsley, W., et al., "Layer Two Tunneling Protocol "L2TP"", Network Working Group, RFC 2661, Aug. 1999.

Aboba, B., et al., "PPP EAP TLS Authentication Protocol", Network Working Group, RFC 2716, Oct. 1999.

Rigney, C., et al., "Remote Authentication Dial In User Services (RADIUS)", Network Working Group, RFC 2865, Jun. 2000.

Rigney, C., et al., "RADIUS Extensions", Network Working Group, RFC 2869, Jun. 2000.

Srisuresh, P., "Secure Remote Access with L2TP", Network Working Group, RFC 2888, Aug. 2000.

de Laat, C., et al., "Generic AAA Architecture", Network Working Group, RFC 2903, Aug. 2000.

Vollbrecht, J., et al., "AAA Authorization Application Examples", Network Working Group, RFC 2905, Aug. 2000.

Thomas, M., "Requirements for Kerberized Internet Negotiation of Keys", Network Working Group, RFC 3129, Jun. 2001.

Patel, B., et al., "Securing L2TP using IPsec", Network Working Group, RFC 3193, Nov. 2001.

"Microsoft Windows 2000 Server: Active Directory in Networks Segmented by Firewalls", Microsoft Windows 2000 White Paper, Microsoft Corporation, Jul. 2002, Updated May 2003.

"Microsoft Windows 2000 Server: Distributed File System: A Logical View of Physical Storage", Microsoft Windows 2000 White Paper, Microsoft Corporation, 1999.

"Microsoft Windows 2000 Server: IP Security for Microsoft Windows 2000 Server", Microsoft Windows 2000 White Paper, Microsoft Corporation, 1999.

"Microsoft Windows 2000 Server: Internet Authentication Service for Windows 2000", Microsoft Windows 2000 White Paper, Microsoft Corporation, 2000.

"Microsoft Windows 2000 Server: Windows 2000 Kerberos Authentication", Microsoft Windows 2000 White Paper, Microsoft Corporation, 1999.

"Microsoft Windows 2000 Server: Smart Card Logon", Microsoft Windows 2000 White Paper, Microsoft Corporation, 1999.

"Microsoft Windows 2000 Server: Administrator's Guide to Microsoft L2TP/IPSec VPN Client", Microsoft Windows 2000 Server Technical Article, Microsoft Corporation, 2002.

"Microsoft Windows 2000 Server: Virtual Private Networking with Windows 2000: Deploying Remote Access VPNs", Microsoft Windows 2000 White Paper, Microsoft Corporation, Jul. 2002.

"Administrator's Guide: Citrix MetaFrame XP Server for Windows, With Feature Release 3", Citrix Systmes, Inc., 2003.

"Connecting Remote Users Across the Internet Using L2TP", Virtual Private Networking Technical Articles, Microsoft Corporation, http://www.microsoft.com/windows2000/techinfo/reskit/deploymentscenarios/scenarios/ras04_connectingremoteusersacrossinternetusingl2lp.asp.

"Active Directory Overview", Part of the Microsoft Active Directory Management Pack Technical Reference guide. Microsoft Corporation, http://www.microsoft.com/technet/prodtechnol/mom/maintain/admptech//admptr03.mspx.

Cross, D., et al., "Windows Server 2003 PKI Operations Guide", Microsoft Corporation, http://www.microsoft.com/technet/prodtechnol/windowsserver2003/technologies/security/ws03pkog.mspx.

De Clercq, J., et al., "Windows 2000 Authentication", Digital Press, Mar. 2001, pp. http://www.windowsitlibrary.com/Content/617/06/1.html through 7.html.

* cited by examiner

SYSTEM FOR SECURE COMPUTING USING DEFENSE-IN-DEPTH ARCHITECTURE

BACKGROUND OF THE INVENTION

1. Field of the Invention

The invention described herein is directed to secure computing via communications with remotely located network domains. More specifically, the invention disclosed herein provides a secure environment for remote computing with multiple network domains using a Defense-in-Depth configuration of commercial off-the-shelf (COTS) components and technologies.

2. Description of the Prior Art

In recent years, as the desire for remotely accessing sensitive information over wide area networks, e.g., the Internet, has increased, much effort has been directed toward insuring the security of transmitted data. Encryption and encapsulation techniques have led to the development of virtual private networks, whereby a user may conduct computer transactions on a remote system from a local computer, provided the user is in possession of the appropriate credentials. Virtual private network technology has led to the proliferation of so-called "telecommuters", i.e., persons who perform their duties from their home and, via a home computer and a virtual private network, has access to their company's computer files remotely located on their company's server.

Remote access to sensitive data requires numerous safeguards so that access thereto is restricted to those who have the appropriate permissions. Such safeguards have, until recently, required non-trivial expansion of an organization's network infrastructure and maintenance requirements and have often required specially designed hardware and/or software. However, due to the high demand for inexpensive and easily maintained security measures, much of the technology has been standardized and incorporated in commercial off-the-shelf (COTS) components. It is now possible for an enterprise to exchange data with remote equipment in a secure manner at a reasonable price.

Certain industries, however, have exceptional security demands due to the nature of the data involved. The military and intelligence communities have strict security policies, especially when the data are vital to National Security. The healthcare industry also has considerable privacy concerns, as do financial institutions where a lapse in data security may result in unrecoverable liabilities. Software development companies also require secure data handling, especially when more than one developer or programmer is operating on a large software project and each requires access to source code files located on servers of separate organizations.

In many cases, an organization maintains its data at ordinal sensitivity levels in separate security network domains. In such environments, a further concern lies in the transfer of data from one domain to a domain of a lesser security requirement. Thus, while it may still be a desirable feature of a multiple-security domain enterprise to allow certain users simultaneous or near-simultaneous access to data from different security zones, additional restrictions must be implemented to insure the containment of data at its designated security level.

A system for secure computing that maintains containment of sensitive data from non-sensitive data is disclosed in U.S. patent application Ser. No. 09/854,818, filed on 14 May 2001, and published as U.S. Patent Application Publication #2002/0169987A1. The disclosed computer system provides a secure computing environment by executing a type II virtual machine monitor on a host operating system platform. The virtual machine monitor spawns a user-definable number of sensitive virtual machines for processing sensitive (classified) data and a user-definable number of non-sensitive virtual machines for processing non-sensitive (unclassified) data. Each of the sensitive virtual machines is isolated from all other virtual machines and operates independently thereof. While the system disclosed addresses the containment of data at a particular user station, it fails to provide a complete enterprise solution. For example, the invention does not contemplate a deliberate attempt to compromise the containment of data if a specially configured computing device were to be inserted into the network of the client device disclosed in the Published Patent Application.

Averting malicious and deliberate attacks on secure networks is among the highest priorities for information technology managers and designers. In the early days of widespread networking, such as via the Internet, defense mechanisms involved the installation of proprietary hardware and software, specially adapted to an end-user's application. However, such mechanisms are notoriously expensive, difficult to maintain, and resistant to system expansion and upgrade.

In recent years, a more practical approach to information assurance has emerged, which relies on multiple, more easily implemented technologies to defend against attempted attacks on an organization's secure data or system. This type of security has come to be known as Defense-in-Depth (D-in-D), and is based on the premise that defeating successive security measures is much more difficult than defeating a single security perimeter. D-in-D also allows a security system designer to implement a total security solution in easily maintained, off-the-shelf components.

SUMMARY OF THE INVENTION

The present invention uniquely combines multiple security mechanisms to provide a Defense-in-Depth security solution for remote computing across multiple security domains. A system for secure computing by the present invention includes client computing means for providing an interface to the secure computing system. The client computing means executes an embedded operating system and an embedded set of computer applications thereon, but is prohibited from executing any other (non-embedded) computer applications thereon. The client computing means is further adapted to prohibit local storage of any user data and of any data produced by the embedded set of computer applications.

The system of the present invention further includes server-based computing means, which are removed from said client computing means, for remotely executing computer applications. The computer applications are accessible over a communication network via the client computing means.

The system of the present invention further includes public key infrastructure means for providing encryption keys and for authenticating identities of the user and of the client computing means to the server-based computing means.

The system of the present invention further includes virtual private networking means for conducting private network traffic over a virtual private network between the user at the client computing means and the server-based computing means. The virtual private network is established only when both the user and the client computing means have been authenticated by the public key infrastructure means.

In another aspect of the present invention, a system for secure computing between a user and at least one remote communication network includes a user identification carrier for inalterably storing a set of user credentials, a client domain network which includes a client computing device including a microprocessor, a network interface circuit, and local internal memory. The microprocessor is prohibited from accessing any memory device other than the internal local memory. The client computing device further includes a set of machine credentials inalterably stored in the local internal memory, an identification reader for retrieving the user credentials from the user identification carrier, an embedded operating system inalterably stored in the local memory, where the operating system prohibits user access to the local internal memory, at least one virtual private network client for conducting network traffic to and from a corresponding one of the remote communication networks, and an application service client providing a user interface to a remotely executed computer application. The client domain network further includes a client domain control server for providing access to the remote communication networks in accordance with a combination of user credentials and machine credentials.

In addition to the user identification carrier and the client domain network, a system of the present invention further includes a perimeter network interposed between the client domain network and the remote communication network. The perimeter network is configured to allow transmission of only network traffic of a predetermined type and prohibits transmission of any network traffic bound from one remote communication network directly to another of the remote communication networks. Additionally, a system of the present invention includes a virtual private network server installed on each of the remote communication networks for terminating a virtual private network corresponding therewith, a directory server installed on each of the remote communication networks for providing remote storage of user data, and an application server installed on each of the remote communication networks for executing user computer applications thereon, for storing the user computer applications thereon and for transmitting user interface data to and receiving user input from a corresponding application service client.

DETAILED DESCRIPTION OF PREFERRED EMBODIMENTS

Figure 1:
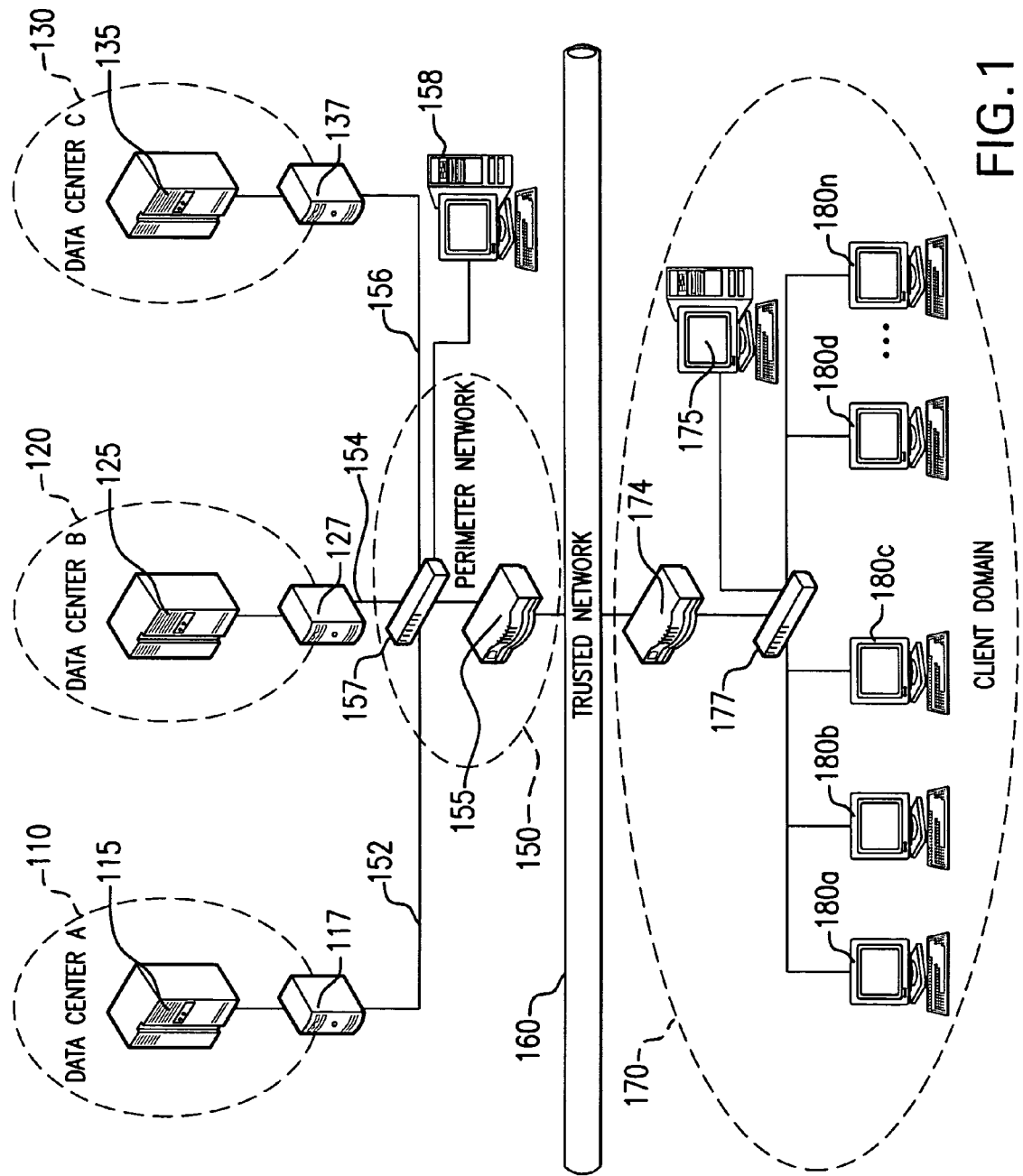
FIG. 1 is a system diagram of the secure computing system of the present invention.

Prior to describing exemplary embodiments of the present invention, it is believed to be beneficial to first briefly describe the major technological components, the combination of which forms the present invention. As previously indicated, a fundamental design goal of the present architecture is to create a secure environment for remote computing using a Defense-in-Depth (D-in-D) configuration of commercial off-the-shelf (COTS) components. To that end, a unique combination of a public key infrastructure (PKI), communication over virtual private networks (VPNs), server-based computing (SBC), and user access through thin client (TC) computing devices provides the overall security mechanism.

Although D-in-D is not new, misinterpretations of the concept have lead to inadequate applications thereof. Key to a D-in-D strategy is the understanding that it is not analogous to a sequence of walls or barriers to penetrate, i.e., once a first barrier is overcome, an attacker has unencumbered access to a succeeding barrier. A more apt analogy and design goal based thereon views D-in-D as a set of concentric spheres, each having a limited number of access ports thereon. Thus, an attacker must locate access through a first sphere and then, under the constraints thereof, locate an access port on the next outermost sphere and so on. As the attacker manages to traverse outer spheres, successively fewer hacking options are available to breach the next sphere in the sequence. Additionally, if the attacker manages to reach the intended target, i.e., the inner core in the present analogy, he must then traverse the concentric spheres in a reverse manner to that previously described, but this time with the added burden of an information payload. Moreover, if the attacker succeeds in removing information from the defensive barriers, added D-in-D mechanisms insure that the information is adequately encrypted, thus further complicating access thereto. The combination of technologies in accordance with the present invention achieves the desired level of complexity for preventing unauthorized access to sensitive material.

A PKI realizes a set of security measures to insure authentication, integrity, confidentiality, and non-repudiation of users, devices, and data participating in transactions thereon. The degree of security provided for by a PKI varies by the specific application and architecture, and numerous implementations thereof are commercially available. As will be discussed below, the present invention provides strong authentication of both users and client computing devices. User certificates on an identification carrier, such as a smart card, and individual machine certificates are issued by certificate authorities respectively located at individual data centers—a user certificate and a machine certificate each being issued by the certificate authority of the corresponding data center to a respective user or a machine allowed access thereto.

The present invention is not limited to the utilization of any specific PKI and, except where otherwise indicated herein, any PKI implementation is intended to fall within the scope of the present invention. Thus, aspects relating to a PKI realization, e.g., key maintenance, certificate revocation, etc., not explicitly disclosed herein, may be fulfilled by any available means known in the art.

VPNs allow secure means for accessing remotely located resources by a user via data encryption and encapsulation and a wide variety of means for carrying out a VPN are known in the art. The present invention allows for the use of any VPN methodology. However, to properly implement the D-in-D as defined above, construction of a VPN is contingent upon authentication via the PKI and remote access to a particular data center is only available via a properly constructed VPN. A detailed description as to how this may be achieved is given via exemplary embodiments in paragraphs that follow.

SBC is well-known in the art and confines the execution of applications to a remote application server, whereby a user is presented only an interface to the application at the local client computing device. Typically, SBC is used to control access to software applications and to ease the administration requirements of software over a large enterprise. While this holds true when incorporating SBC into the D-in-D architecture of the present invention, it also removes the requirement that sensitive data be transported to a user's machine so that a program otherwise operating on the user's machine has access thereto. The present invention maintains all data at the data center, which is only accessible over a VPN constructed after successful authentication by the PKI. Moreover, as the application service resides on an application server at the data center, as will be described further below, all applications are accessed only over a VPN constructed subsequent to successful authentication by the PKI of the present invention. Many methods of SBC are known in the art and, except where indicated herein, the present invention is not limited to any specific implementation thereof.

In carrying out the D-in-D architecture of the present invention, a thin client computing devices fulfills the role of a user terminal. TC computing is a relatively recent technology in the field of network computing and, as such, a clear definition as to what constitutes a TC computing device is somewhat evasive. Present terminology includes, e.g., "fat clients", "thin clients", and even "lean clients" which seems to indicate that the field is ill-defined. For the purposes of describing the present invention, a TC will refer to a client computing device: a) having no persistent user data storage capability and b) mechanisms to prohibit a user from compromising the operating system running thereon. To carry out the D-in-D architecture of the present invention, any computing device operating under the TC restrictions defined here may be used.

Embodiments of the present invention may be understood with reference to the diagram of the exemplary system illustrated in FIG. 1. Data center network A, shown at 110, data center network B, shown at 120, and data center network C, shown at 130, are communication networks, each having its own organizational structure. The networks 110, 120, 130 may be, respectively, separate network domains, enterprises, Microsoft® Windows® server forests or other organizational structures. Each network 110, 120, 130 embodies a corresponding data center infrastructure 115, 125, 135, respectively. As will be discussed in paragraphs that follow, the network infrastructures 115, 125, 135 include service providing subsystems for carrying out D-in-D security related tasks.

The networks 110, 120, 130 may each respectively operate under distinct security restrictions. For example, network A may be maintained at the highest security sensitivity level (e.g., top secret), network B may be maintained at a lower security sensitivity level (e.g., secret), and network C may be maintained at the lowest security sensitivity level (e.g., unclassified). Access to each data center 110, 120, 130 is allowed only through VPN gateway servers 117, 127, 137, respectively, as will be clarified below.

Each gateway device 117, 127, 137 is respectively coupled to perimeter network 150 via circuit paths 152, 154, 156. Perimeter network 150, also referred to as a demilitarized zone, or DMZ, provides segregation of traffic of respective data center networks 110, 120, 130 from a wide area network (WAN) or local area network (LAN), such as trusted internal network 160. Additionally, peripheral network 150 provides an electrical connection point for networks 110, 120, 130. It is important to note that circuits 152, 154, 156 are not necessarily physically separated conductors, but may be virtual circuit connections. However, when traffic from one or more of networks 110, 120, 130 traverses physically separate media, peripheral network 150 provides a common point of electrical connection.

The peripheral network 150 is further coupled to trusted network 160, which may be an enterprise backbone carrying only network traffic internal to the enterprise. Trusted network 160 is further coupled to client domain network 170, which includes a plurality of client computing devices 180a-180n. Client domain network 170 as well as networks 110, 120, 130 will be described in detail in paragraphs that follow.

Traffic through perimeter network 150 may be monitored by perimeter network monitor 158 to ensure that traffic traversing perimeter network 150 is of a predetermined type. To monitor the traffic in the perimeter network 150, perimeter network switch 157 is preferably configured to allow "snooping" on a promiscuous port thereof. Perimeter network monitor 158 then utilizes a packet sniffing program, e.g., SNORT, being executed thereon to perform the monitoring.

As is shown in FIG. 1, each of the perimeter network 150 and client domain network 170 includes a filtering router 155 and 174, respectively. Each of the filtering routers 155, 174 is configured to provide filtering of data packets so as to permit only encrypted traffic between the client domain network 170 and any of networks 110, 120, 130. This may be accomplished in any known manner, for example, through the use of packet filters and access control lists stored within each router 155, 174. In certain embodiments of the present invention, if a packet is not of a predetermined type, as described below, or is addressed to other than the client domain network 170 or one of networks 110, 120, 130, the offending packet is dropped.

Further shown in FIG. 1 is a network data switch 157 in perimeter network 150 and a network data switch 177 in client domain network 170. Each network data switch 157, 177 is configured to prohibit a network component coupled thereto from communicating directly with any other network component coupled thereto (with the obvious exception of devices coupled to the network data switch promiscuous port). That is to say, network traffic from any of VPN gateway servers 117, 127, 137 may not traverse network data switch 157 and be received directly by any other VPN gateway server. Similarly, network traffic emanating from any client computing device 180a-180n is blocked by network data switch 177 from directly reaching any other client computing device. As will be shown below, this configuration provides a layer of D-in-D, especially useful when the data centers 110, 120, 130 are maintained at different security levels so as to prevent sensitive data from being transferred to unauthorized entities.

In certain embodiments of the present invention, network data switch 177 in client domain 170 is further configured to prevent access to client domain services system 175 by entities outside of client domain network 170. More specifically, network data switch 177 ensures that client domain services system 175 communicates only with client computing devices and not the filtering router 174. As will be explained further below, this security measure eliminates any remote logon capability to client domain network 170 and prevents remote access to any persistent storage capability of client domain services system 175.

In particular embodiments of the invention, each client computing device 180a-180n is a thin client device as defined above. As such, each client computing device 180a-180n executes no programs locally unless otherwise provided for. All applications are executed on an application server in one of the remote server networks 110, 120, 130 and the thin client device is presented only with a graphical user interface to the application. Additionally, each thin client device 180a-180n prohibits any user data from being stored locally on the device. This prevents a user from transferring sensitive data from a security domain (e.g., one of remote server networks 110, 120, 130) to an insecure location. Additionally, thin client devices 180a-180n have integrated therein an embedded operating system and is configured such that the parameters of the operating system may not be altered. Details of an exemplary thin client device will be provided below with reference to FIG. 3.

Each data center network 110, 120, 130 has installed thereon an application server for remotely executing the program code of computer applications. As stated above, a user's applications are executed on a corresponding application server as opposed to being executed on a user's local machine. Thus, no secure data or application is transferred into client domain 170, but rather is maintained at the data center 110, 120, 130 in accordance with its associated security restrictions. In certain embodiments of the present invention, the application server transmits images of presentation data as opposed to sending raw data to the client machine where further processing would be necessary to present the data on a display device. The application service client on the thin client machine then displays those images as they would be displayed had the application been running on the local machine. This relieves the requirement that raw, and possibly sensitive, data be transferred to the client machine, if only for display purposes.

Certain PKI implementations utilized by the present invention provide for strong authentication in gaining access to a particular data center 110, 120, 130. In those embodiments, a user identification carrier, such as a smartcard, has unalterably stored thereon a user certificate issued from a certificate authority located at one of data centers 110, 120, 130. In certain embodiments, a user possesses a smartcard for each data center for which he is allowed access. The smartcard is inserted into a smartcard reader installed on the thin client device, as will be discussed in paragraphs that follow, to gain access to resources located at the corresponding data center 110, 120, 130.

PKI implemented by the system of the present invention further enforces the authentication of each thin client device 180a-180n as a valid member of the client domain 170. Each client computing device 180a-180n has inalterably stored thereon a machine certificate to authenticate the thin client to the client domain services system 175. In certain embodiments of the present invention, each thin client device 180a-180n will additionally have stored thereon machine certificates issued from the certificate authority of each data center 110, 120, 130 to which that particular machine is allowed access.

According to the present invention, a VPN from the user's client machine 180a-180n to a VPN gateway server 117, 127, 137 on the perimeter of a particular data center is established subsequent to a successful authentication of the user and the user's thin client device to the data center (an exemplary user session is described below). The VPNs may be established in accordance with established methods and protocols. In certain embodiments of the present invention, the VPNs utilize Internet protocol security (IPSec) mechanisms for communicating between entities. Additionally, the VPNs may implement the Layer 2 Tunneling Protocol (L2TP) using IPSec (LZTP/IPSec) for transporting data from a client computing device 180a-180n to the data centers 110, 120, 130, and vice-versa. The filtering routers of the present invention may then be configured to permit only traffic of a small number of ports and protocols, e.g., User Datagram Protocol (UDP) port 500 (Internet Key Exchange, or IKE), Protocol 50 (Encapsulating Security Payload, or ESP) and UDP port 1701 (L2TP), protocol 50 (ESP).

Figure 2:
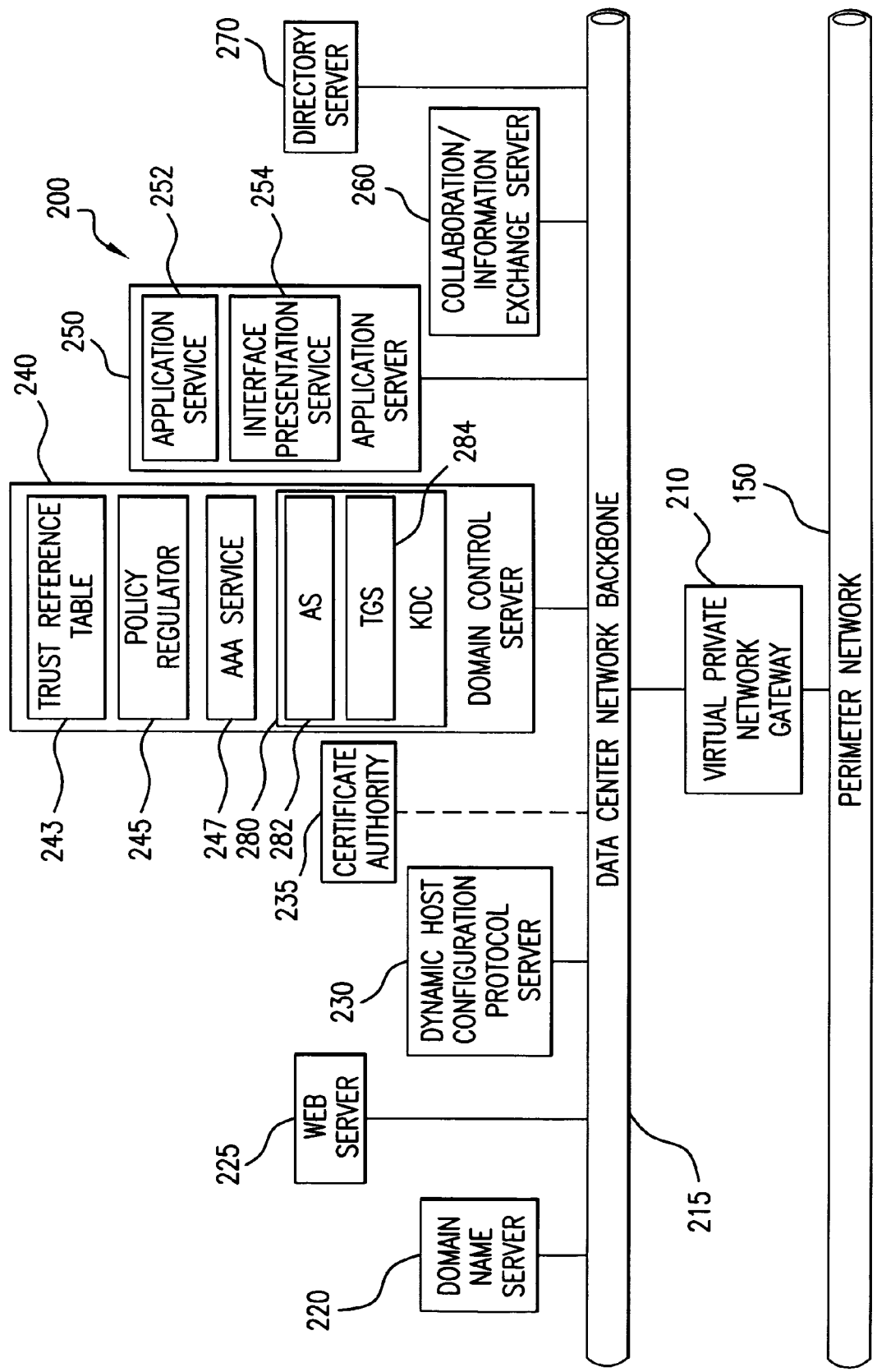
FIG. 2 is a block diagram of an exemplary data center network of the present invention.

Referring now to FIG. 2, there is shown an exemplary infrastructure 200 of each remote server network 110, 120, 130. It should be understood that although the components of network infrastructure 200 are shown as discrete components, the services provided by each component need not be executed on separate pieces of hardware. In fact, in some embodiments of the present invention, many of the functions provided by the components of FIG. 2 may be by functions of a single software package, such as an operating system. For example, Microsoft® Windows® 2000 server and later operating systems have incorporated therein many of the services that will be discussed presently and may be used to implement certain embodiments of the present invention.

As is illustrated in the Figure, data center infrastructure 200 includes a number of servers, each providing one or more services to the present invention, interconnected by data center network backbone 215. As previously stated, remote access to the services provided by infrastructure 200 is only allowed through VPN gateway 210.

Domain name server 220 is a typical domain name system (DNS) server widely used on the Internet. The DNS server 220 at each data center 110, 120, 130 resolves the name of a data center service site to its associated Internet protocol (IP) address.

Web server 225 is a typical web server widely used on the Internet for storing web pages and for providing the web pages to a requesting client upon receipt of the appropriate command. Web server 225 may be coupled to the Internet (not shown) via typical means, but appropriate measures must be taken so that the security of the data center is not compromised. Certain embodiments of the present invention utilize well-known intrusion detection systems when a data center is coupled to the Internet. However, in some applications, connection to the Internet would pose too great a security risk. In those cases, web server 225 may be used to provide web pages on the data center intranet.

Dynamic host configuration protocol (DHCP) server 230 is a typical DHCP server widely used on the Internet for automatically assigning dynamic IP addresses to the components of the corresponding data center 110, 120, 130.

Each data center 110, 120, 130 respectively maintains its own corresponding certificate authority (CA) 235. As is known in the PKI art, each CA 235 issues certificates containing a private encryption key and a public encryption key, for encrypting network traffic. The issued certificates are also used to authenticate the identity of users and machines to a requesting entity. Thus, in certain embodiments of the present invention, CA 235 issues certificates for individual users on behalf of the data center network to which it is connected. Additionally, the certificate authority 235 also issues machine certificates for individual thin client machines 180a-180n for the corresponding data center.

In certain embodiments of the present invention, certificate authority 235 is not electrically coupled to data center network backbone 215, as indicated by the dashed connection line. This is especially true if certificate authority 235 is simultaneously the self-signing root CA as well as the issuing CA. In such cases, certificate authority server 235 is equipped with the necessary hardware to install a digital certificate on a certificate bearing device, e.g., a smartcard for users and flash memory of a thin client computing device. Moreover, it is then necessary to manually maintain, my methods well known in the PKI art, a database of issued certificates for access by domain control server 240.

In accordance with well-established PKI practice, certificates issued by CA 235 are maintained in a secure, preferably encrypted, database or certificate store accessible to authentication, authorization, and accounting (AAA) service 247. In certain embodiments of the present invention, AAA service 247 is a component of domain control server 240. In other embodiments, AAA service 247 may be a component of a Remote Authentication Dial-In User Service (RADIUS) Server, such as is well known in PKI art. In any case, AAA service 247 executes a suite of procedures to confirm the identity of a party requesting access to the data center network 200 in accordance with a trust relationship (authentication), to grant or deny a users request for access to services and resources on data center network 200 based upon predetermined policies set for the user as a group to which the user belongs (authorization), and to collect and report information regarding consumption or usage of the services and resources on data center 200 by the user as governed by the associated policy applied (accounting). Whereas, these AAA functions are well known in the art and will not be discussed in detail here, deviations from common practice corresponding to aspects of certain embodiments of the present invention will be made clear below where applicable.

A certificate issued from CA 235 identifies a user to the data center 200 via well known mechanisms, e.g. a certificate generated in accordance with the International Telecommunication Union (ITU) X.509 recommendation. The identity of the certificate issuee is held in subject fields as a hierarchically structured name, email address, uniform resource identifier (URI) or other unique identifier. This identity may be used to specify a user account on which the user's applications data are maintained. As previously stated, access to data center resources are controlled by a user's overall applied policy, which is discussed further below. Policy regulator 245 applies the applicable policies in a predetermined order of precedence to produce an overall effective user policy upon a successful user logon to the data center 200.

In addition to AAA service 247 and policy regulator 245, certain embodiments of the present invention make provisions for domain controller server 240 to include a trust reference table 243. The trust reference table 243 includes a list of certificate authorities which can be trusted by security domain network 200 to issue valid (traceable to a reputable root CA) digital certificates (a one-way trust). Trust reference table 243 also includes a list of organizations which trust CA 235 and accepts as valid certificates issued therefrom. An organization referenced in both lists is said to have a two-way trust with security domain network 200. The trust reference table 243 may be used during authentication of users and machines to verify that a two-way trust exists between data center 300 and the CA that issued the certificate presented thereto. This implements an additional layer of D-in-D.

In accordance with aspects of the present invention, data center 200 may, in certain embodiments, require authentication using a first set of credentials, e.g., a client computing device machine certificate in combination with a user certificate, each issued from CA 235, to establish a particular network communication condition, e.g., an L2TP/IPSec tunnel, and subsequently requiring authentication via a second set of credentials, e.g., a Kerberos ticket issued from a Kerberos Key Distribution Center (KDC) on the client domain network 170, to logon to the network. To that end, data center network 200 includes a Kerberos KDC 280 to provide the infrastructure for authenticating users and machines with a Kerberos ticket. As is shown in FIG. 2, KDC 280 may be a service provided by domain control server 240. As is well known in the art, the KDC 280 provides an authentication service (AS) 282 for issuing Ticket Granting Tickets for the purpose of accessing a Ticket Granting Service (TGS) 284. The TGS 284 issues session tickets to services within the data center 200 or to the TGS of a trusted domain. Kerberos is a standardized network authentication service well known in the network security art and as such, will not be further detailed. An application of Kerberos as a D-in-D layer of defense of the present invention is discussed in paragraphs that follow.

Application server 250 allows one or more users to execute applications in separate protected sessions. Whereas, application server 250 is shown in FIG. 2 as a single server, the application service 252 itself is typically executed on multiple servers in a server farm. The servers within the server farm may execute applications on different operating systems, e.g., one or more servers may be running under a Microsoft® Windows® operating system and one or more servers may be running under a UNIX operating system. Applications are executed on a suitable operating system platform on application server 250 as opposed to being executed on the thin client device.

As will be further discussed below, each client domain computing device 180a-180n executes a client agent which presents to the user an interactive interface to the application running on application server 250. Preferably, the interface will appear to function in the same manner as the interface of the actual application of which the user may already have a working knowledge. Moreover, the application being executed on application server 250 will respond to user input as if the user was operating the application interface at application server 250.

To provide further security to sensitive data, certain embodiments of the present invention provide application server 250 with interface presentation service 254. The interface presentation service 254 converts the interface of an application executed by application service 252 into an image thereof, which is then transmitted, along with data to accommodate user input such as mouse-clicks, to the corresponding client domain computing device 180a-180n. The application service client agent on the client machine presents the image to the user. All interactions with the user are on the transmitted image rather than on actual data. In this manner, sensitive data is maintained per its associated security sensitivity level at the security domain network site. A new image is then transmitted as appropriate when changes in the user interface occur, either as a result of an application side update or as the result of user input.

Server-side computing technology is widely available on COTS components. One such application service with sufficient features to implement the present invention is that of Citrix® MetaFrame® Presentation Server access service suite.

Collaboration/information exchange server 260 is a collaboration, messaging, and email server readily available as a COTS component, such as Microsoft® Windows® exchange server.

Directory server 270 is a distributed file system (DFS) such as is well-known in the networking art. The directory service provided by directory server 270 unites files on the different computers in security domain network 200 into a single name space. The directory service provides a global catalog of various network objects (servers, users, files, etc.) according to a logical sense as opposed to a physical sense. Thus, the physical location of data is transparent to both users and applications.

Figure 7:
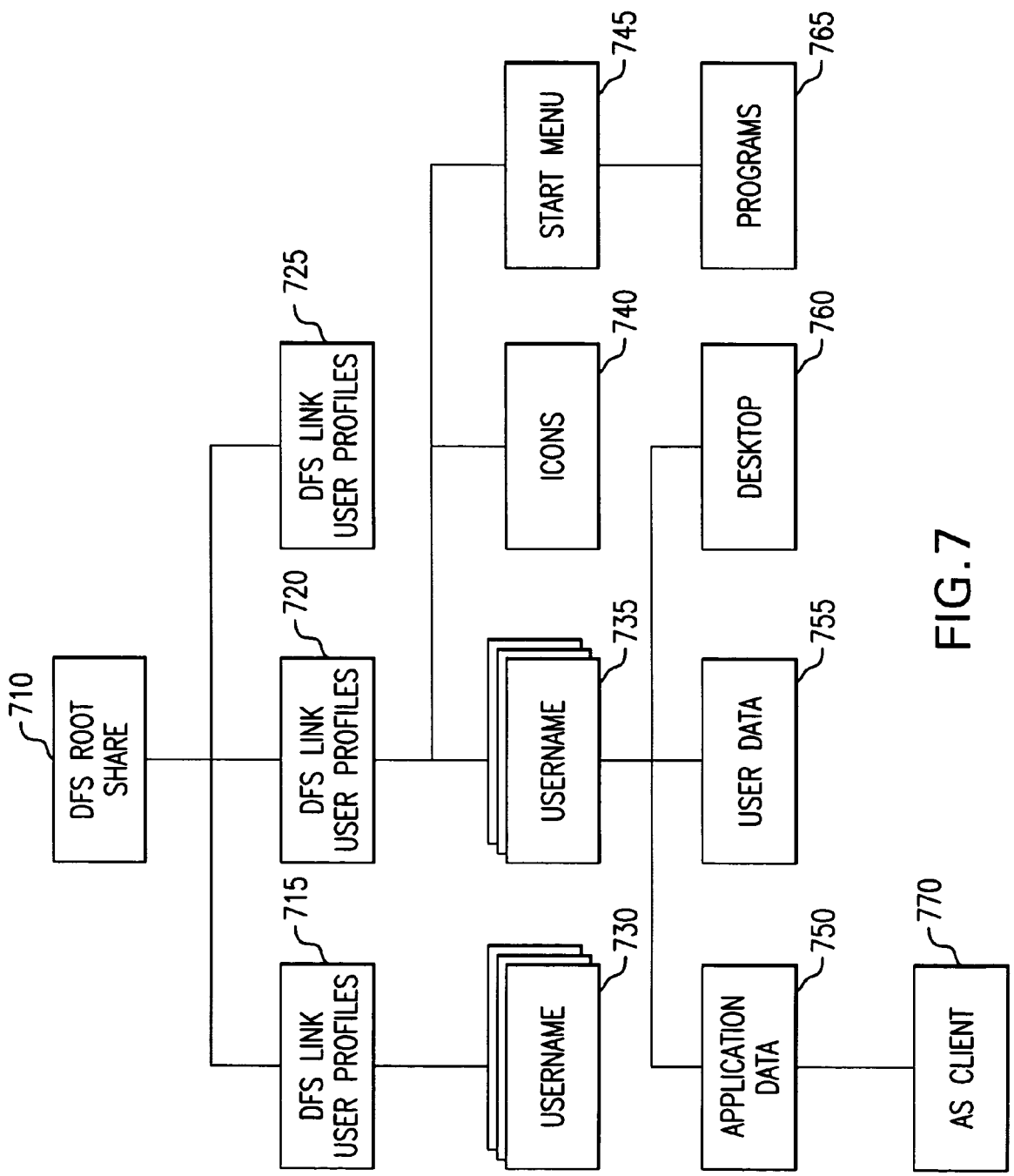
FIG. 7 is a block diagram of a distributed file system hierarchy as implemented by the present invention.

An exemplary DFS hierarchy for use in the system of the present invention is illustrated in FIG. 7. The DFS includes a root share 710, under which all other DFS entities are located. The root share 710 encloses a number of DFS links to user profiles 715, 720 and other shares 725. A share volume for each user 730, 735 is established, for example, on directory server 270 and the user shares 730, 735 and user profiles 715, 720 may be bound to the user identification stored in the user certificate, as described above. Shared resources such as icons 740 and a start menu share 745 containing programs 765 are also located in the user profile level of hierarchy.

Each user share 730, 735 may include an application data share 750, user data share 755, and a desktop configuration 760. The application data share is coupled to an application service client share which is used to publish a desktop to the client computing device 180a-180n.

A user connecting to the directory service name space is permitted access to only files for which he has the appropriate permissions and a directory structure is created for the user in accordance with a user profile. All network objects for which permission for access has not been granted are excluded from the user's view of the directory service name space.

Figure 8:
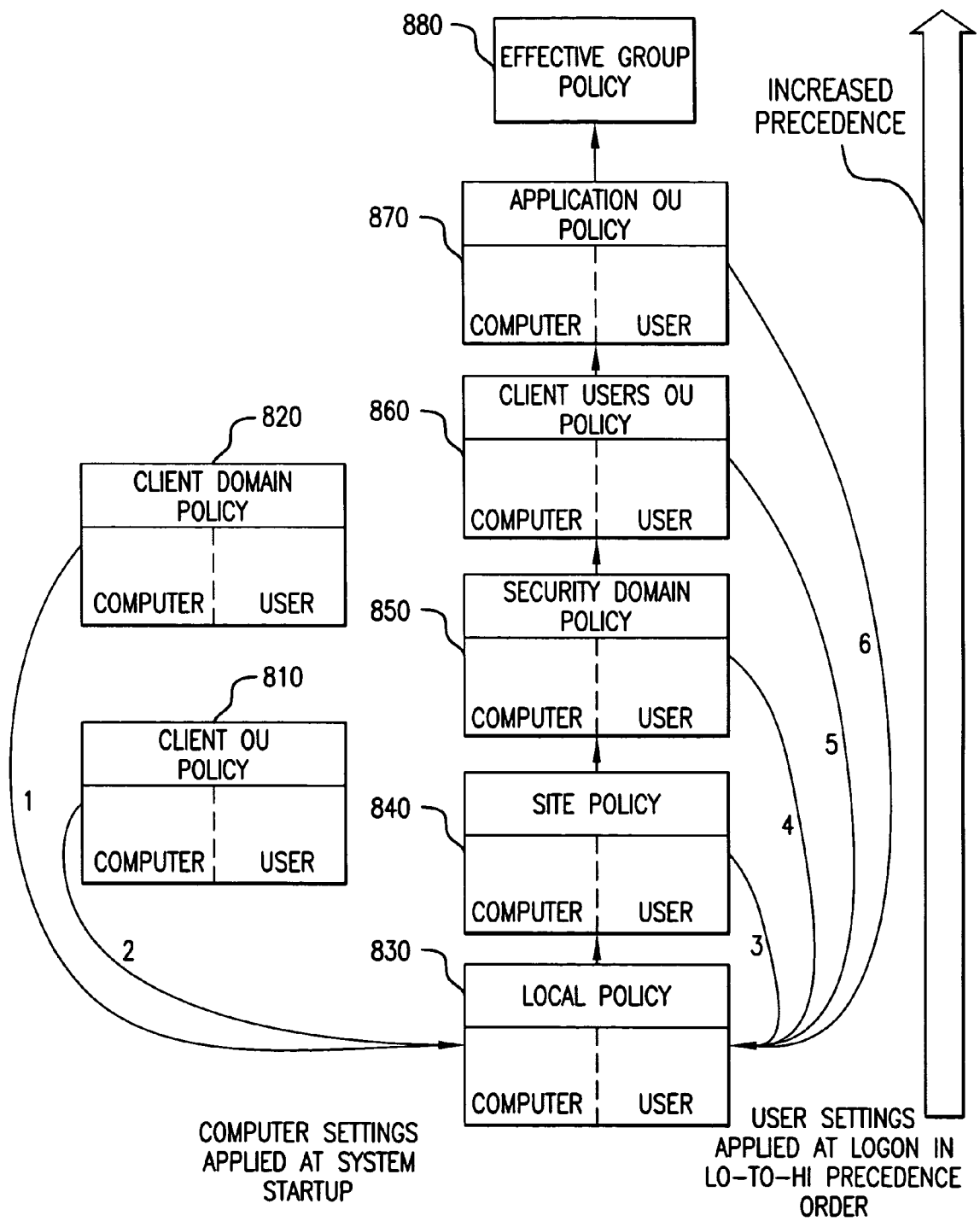
FIG. 8 is a block diagram illustrating the application of group policies in accordance with the present invention.

As stated previously, access to services and files on the remote server network 200 are enforced by policy regulator 245. FIG. 8 illustrates an exemplary hierarchy of group policy levels in the system of the present invention. When client computing device 180a-180n is booted, the group policy computer settings are applied from the local group policy 830. Subsequently, the client domain group policy 820 is applied and, finally, the client organizational unit (OU) group policy 810 is applied. The order in which the group policies are applied are indicated by the numeral beside the associated arrow. The result is an effective computer group policy in which the domain group policy dominates the local group policy, and the client OU group policy dominates the domain group policy. When the user logs on to the system with a user identification such as a smart card, the group policy user settings are applied to the session in the following order: local group policy 830, site group policy 840, security domain group policy 850, and client user's organizational unit group policy 860. The result is an effective group policy in which the client user's organization unit group policy dominates the local, site, and security domain group policy user settings whereby conflicts between successively applied policies are resolved by the last policy applied unless a "no-override" switch is activated in the policy regulator 245.

When a user launches an application that runs on application server 250, the application organizational unit user group policy 1070 settings are applied to the user's effective group policy 1080. The application OU group policy is applied in "loopback" mode, i.e., it overrides all other policy settings. This results in all invoked application service applications running under the application OU group policy 1070.

As previously stated, several components of security domain network 200 may be combined and may be executed by a single piece of computing equipment executing one or more software programs. For example, domain control server 240 and directory server 270 may reside on a single computing device and the services thereof be performed by a multiple featured server software, such as Microsoft® Windows® 2000 server or later. When such a system is implemented and the Windows® 2000 server or later has installed thereon Microsoft® Active Directory, the resulting server system is referred to as a Microsoft® Windows® Server domain controller. The Microsoft® Windows® Active Directory provides a central information store of the network objects on the network to which it is connected. Thus, configuring each component of security domain network 200 so as to implement the present invention is achieved at a central location, i.e., the domain controller.

VPN gateway 210 provides the secure interface to the data center 200. As such, it provides several services to maintain a defensive barrier at the VPN boundary to data center 200. First, the VPN gateway 210 monitors network traffic to detect an Internet Protocol Security (IPSec) Security Association (SA) negotiation for an L2TP tunnel. This is an indication that an entity is attempting to initiate a VPN session with the data center 200. VPN gateway 210 must authenticate and authorize the entity prior to allowing data to flow through the gateway. The VPN gateway 210 uses the user credentials and other connection-related data to create an access request message that is sent to the AAA service 247 via well-established authentication messaging techniques. If the connection attempt is authorized, AAA service sends an accept access message to VPN gateway 210 and a VPN tunnel is established as, for example, an L2TP/IPSec tunnel. If the connection is not authorized, a reject access message is transmitted to VPN gateway 210 and access to the data center is blocked. Note that while a credential bearer such as a user or machine must authenticate itself to the VPN gateway 210, it must also authenticate to the domain, e.g. via Kerberos, before access thereto is granted. Authenticating to the VPN gateway 210 only establishes the secure network communication channel, e.g., an L2TP/IPSec tunnel, for further communication with the data center 200. A logon is implemented in the exemplary user session described below with reference to FIG. 6.

VPN gateway 210 further serves as a router for forwarding packets from the client domain computing devices 180a-180n to the appropriate data center server. The VPN gateway 210 is the terminus of the VPN tunnel and the packet header encapsulated in a data packet is read thereby and forwarded to a data center server per the routing information held in the encapsulated packet header. In certain embodiments of the invention, the VPN gateway 210 router table includes a default router to the filtering router 155 in perimeter network 150. This assures that the VPN gateway 210 is reachable from the client domain network 170 over a wide area network, such as trusted network 160. The VPN gateway 210 router table may also include routes to any sub-network routers within the data center 110, 120, 130 so that all data center services are reachable from VPN gateway 210.

The VPN gateway 210 router function may add a further layer of defense if equipped with packet filtering capabilities. In certain embodiments of the present invention, the packet filters of VPN gateway 210 router are set to drop all packets that are neither bound for nor transmitted from the filtering router 155 of perimeter network 150. Additionally, in embodiments of the invention, the packet filters are configured to drop all packets that are not of traffic of the particular tunnel type, such as User Datagram Protocol (UDP) port 500, protocol 50 and UDP port 1701.

Figure 3:
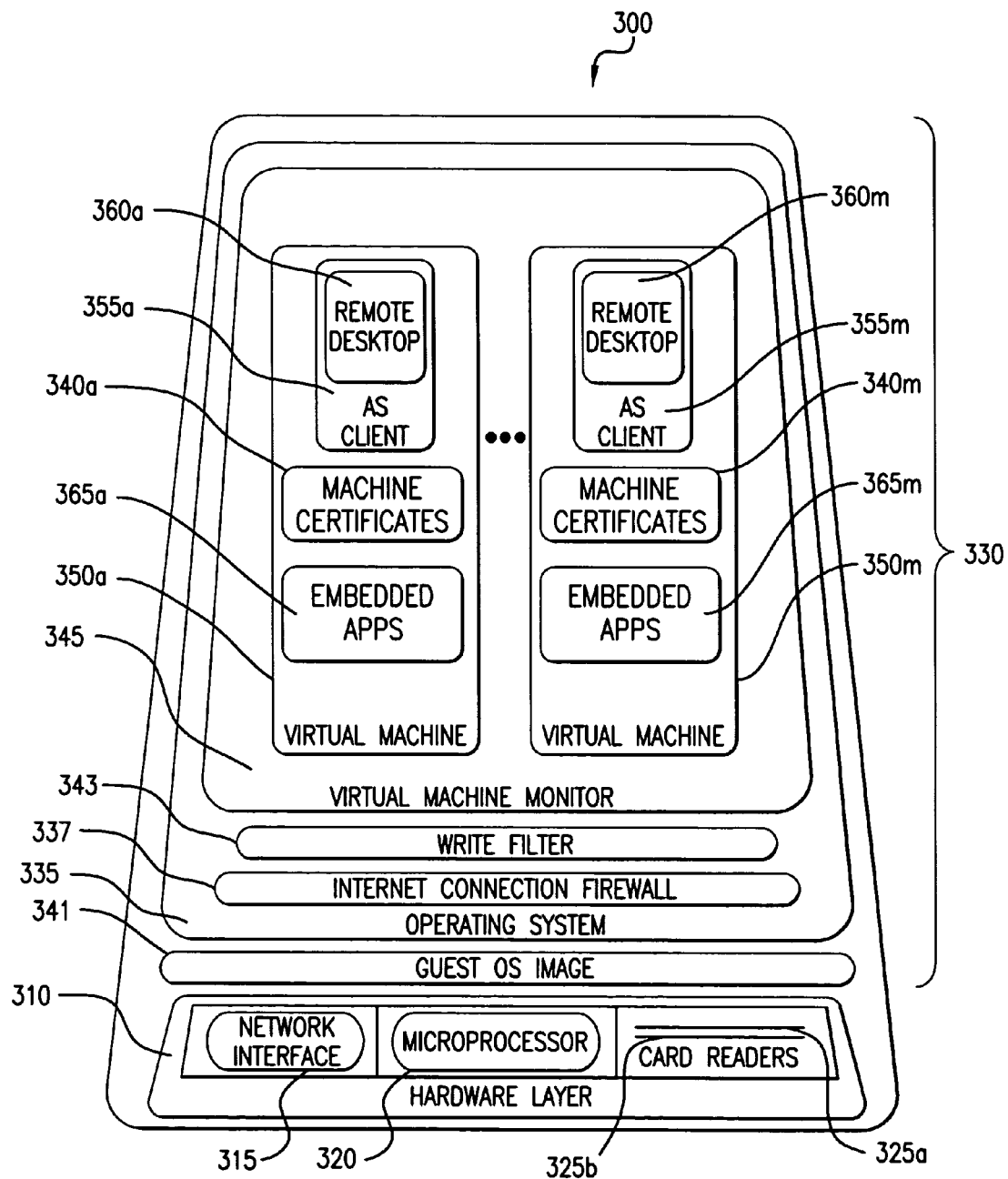
FIG. 3 is an illustration of the thin client computing device utilized by the present invention.

Referring now to FIG. 3, there is shown an exemplary thin client device for implementing a user interface with one or more data centers 110, 120, 130 in accordance with the present invention. Thin client device 300 is a COTS computing device having no persistent local user storage capabilities such as hard disks, floppy disks, etc. Computing device 300 includes various hardware components 310 and local internal memory 330. Memory 330 is a mixture of dynamic random access memory and flash memory, the former being used as a local scratch pad area and the latter being used to accommodate a persistent image of an operating system 335 and embedded software applications. In certain embodiments of the present invention, the user has no access to the local internal memory 330 of thin client device 300. In other embodiments of the invention, the dynamic random access memory used as the local scratch pad is completely erased during log off procedures of thin client device 300 in accordance with applied group policies or through memory write filter 343, as will be described below.

Hardware layer 310 includes a network interface 315, a microprocessor 320, and a plurality of card readers 325a, 325b. Whereas only two card readers are shown in the illustration, certain embodiments of the present invention include one card reader for every data center 110, 120, 130 for which thin client device 300 is anticipated to be granted access. The card readers are used to accommodate a smartcard on which is inalterably installed a user certificate issued from a certificate authority of a corresponding data center 110, 120, 130. It should be clear to one skilled in the art that hardware layer 310 may include other hardware components such as a video display adaptor, input device ports, etc.

As is illustrated in the Figure, an operating system 335 is imaged onto the flash memory space of client computing device 300. In certain embodiments of the present invention, the operating system 335 is a multi-tasking embedded operating system, such as is commercially available as Microsoft® Windows® XPe. The operating system 335 is typically an image of an operating system configured on a stand-alone imaging server prior to being uploaded to the computing device 300. In certain embodiments, other applications may be embedded on client computing device as authorized by the applicable security officer, examples of which are discussed below. The embedded applications are the only applications allowed local execution, i.e., executed on the client machine 300. All other applications are executed on application server 250 on a corresponding data center 110, 120, 130.

In certain embodiments of the present invention, operating system 335 is configured during provisioning procedures of computing device 300 with a single administrator account and no user accounts. Once the computing device has been properly configured, the single administrator account is removed. This assures that a user may not log on to thin client device 300 as a local user or an administrator in an attempt to alter operating system parameters of the embedded operating system 335.

Prior to its installation into the secure network of the present invention, a thin client device must first be provisioned with the necessary operating system and software components shown in the exemplary configuration of FIG. 3. As previously stated, operating system 335 is an image configured on a stand-alone imaging server. The imaging server further installs other software components if such components are allowed by an authorized security officer. For example, some embodiments of the present invention may allow collaboration software to be installed on individual thin client machines. When software is allowed to be used, it must be installed as a permanent installation via the imaging server, as no persistent storage capability is allowed on thin client device 300. Additionally, the user must not be permitted to alter the parameters of the embedded applications 365a-365m, nor may the embedded applications be permitted to store user data in local internal memory 330. In certain embodiments of the present invention, all embedded applications 365a-365m are maintained respectively executed only under a corresponding guest operating system of a VM 350a-350m. As such, embedded applications 365a-365m are stored as part of guest operating system (OS) image 341 as described below.

As is shown in FIG. 3, software installed on thin client device 300 includes a virtual machine monitor 345 for instantiating and executing virtual machines 350a-350m, as will be discussed in paragraphs that follow. In other embodiments of the invention, thin client device 300 may include multiple virtual machine monitors, each executing a single virtual machine thereon. In either case, each virtual machine 350a-350m is an image of a guest operating system having machine certificates 340a-340m, respectively, an application service client 355a-355m, respectively, and embedded applications 365a-365m, respectively. The virtual machine is held as a guest OS image 341 in flash memory of local internal memory 330 as installed by the image server when thin client device 300 is provisioned. When a virtual machine is to be instantiated by a virtual machine monitor 345, a copy of the guest OS image 341 is retrieved by the virtual machine monitor 345 as one of virtual client machines 350a-350m.

Once the operating system 335 and the guest os image 341 have been installed on client computing machine 300, the issuance of machine certificates are requested of the certificate authorities from each data center 110, 120, 130 for which the machine is to be allowed access. This generally requires that the thin client device be physically located at the appropriate certificate authority, in that, without a machine certificate for the data center, a VPN tunnel cannot be established with the data center and can therefore not transfer data beyond the applicable VPN gateway. Additionally, a certificate may not be installed via portable storage, e.g., a floppy disk, in that, as previously stated, thin client device 300 does not include any local storage capability. The machine certificates are stored in the guest OS image 341 and are copied into the instantiated virtual machines as machine certificates 340a-340m. In like manner, the client computing device 300 must have issued thereto a machine certificate issued from a certificate authority of the client domain 170. The client domain machine certificate is used to authenticate a virtual client machine 350a-350m to the client domain upon instantiation by virtual machine monitor 345.

When the client computing device 300 has been adequately configured so as to implement its functions in accordance with the present invention, a locally resident program is executed thereon which prohibits the alteration of any flash memory location within memory space 330. In certain embodiments of the present invention, this is accomplished by activating a write filter 343 which then prohibits the writing to any flash memory location. This not only prevents the local storage of sensitive data locally on client device 300 between user sessions, but also prevents the alteration of any operating system parameter. Additionally, as previously stated, in certain embodiments of the present invention, when the thin client device has been configured, the resident program removes the administrator account thereby permitting only users having credentials issued from a data center CA log on permission to the data center. The client machine 300 itself has no user accounts thereon, thus no local logon the client machine 300 is possible.

Virtual machine monitor 345, in certain embodiments of the present invention, insures that the virtual machines 350a-350m are isolated from one another as well as being independently executed. This is accomplished either by ensuring that each virtual machine 350a-350m is independently executed in memory allocated for that virtual machine or by instantiating each virtual machine 350a-350m under a separate virtual machine monitor. In the case of the former, each segment of allocated memory is isolated from all other segments allocated for other virtual machines. In certain embodiments of the present invention, data from memory allocated for one virtual machine may not be transferred to memory allocated to another virtual machine via a user action such as cut-and-paste from one machine to another. This adds a further layer of defense to insure that sensitive data is maintained in an environment appropriate to its respective sensitivity level.

When thin client device 300 is properly configured and installed as one of client computing devices 180a-180n, and a user logs on to a data center via a log-on procedure discussed in paragraphs below, a virtual machine is created on which an application service client 355a-355m is executed. The application service client 355a-355m communicates with the application service 250 in the data center. As previously stated, no applications are executed locally on the client computing device 180a-180n unless otherwise provided for. The user is only presented the interface of the application being executed on application server 250. When the user logs off of the data center, the memory allocated for the virtual machine created for that application service session is erased.

As previously stated, in certain embodiments of the present invention, only images of the user interface are transferred from application server 250 in the data center to client computing device 180a-180n in the client domain. The user interacts with a remote desktop 360a-360m respectively running on a corresponding virtual machine 350a-350m. The remote desktop 360a-360m appears to the user as would a desktop of an operating system being executed on the local machine. Additionally, in certain embodiments of the present invention, virtual machines 350a-350m may simulate systems of different operating system computing platforms and the corresponding remote desktop 360a-360m appears as a desktop would for the corresponding operating system.

As is shown in FIG. 3, some implementations of the present invention include an Internet connection firewall 337 employed by the embedded operating system 335 on the thin client physical network connection. Packet filters within Internet connection firewall 337 may be configured to block certain types of network traffic. The Internet connection firewall 337 may be deployed to add another layer of defense to the secure computing architecture of the present invention.

Figure 4:
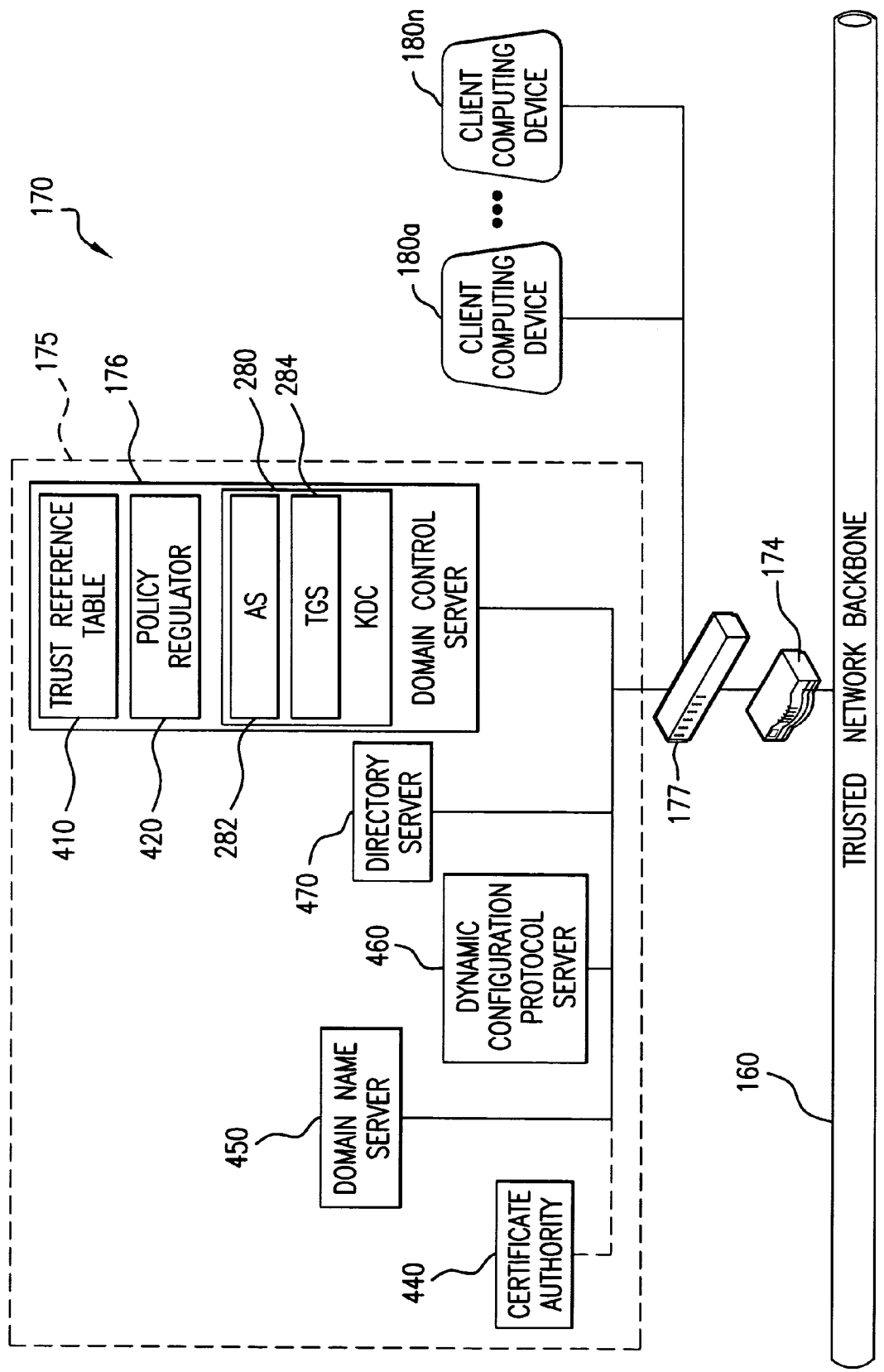
FIG. 4 is a block diagram of an exemplary client domain network of the present invention.

Referring to FIG. 4, there is shown a block diagram of a set of components that form an exemplary client domain network of the present invention. As is shown in the Figure, client domain network 170 includes in client domain services system 175 a certificate authority 440, a domain name server 450, a dynamic configuration protocol server 460, a directory server 470, a domain control server 176, and a plurality of client computing devices 180a-180n. In certain embodiments of the present invention, the individual services of client domain services system 175 are implemented on a single computing device and under a single operating platform, such as a Microsoft® Windows® Server domain controller. The components of client domain network 170 are coupled to client domain network data switch 177. Certificate authority 440, domain name server 450, dynamic configuration protocol server 460, and KDC 490 are functionally equivalent to certificate authority 235, domain name server 220, and dynamic host configuration protocol server 230, respectively, of data center network 200 respectively performing the corresponding services on behalf of client domain 170. Directory server 470 and domain control server 176 have similar features implemented by directory server 270 and domain control server 240, respectively, of data center network 200, but are configured for use in client domain network 170. A notable difference exists, however, between the exemplary client domain control server 176 and a data center domain control server 240. Client domain control server 176 is absent the AAA service included in data center domain control server 240. Remote access to client domain network 170 is prohibited and client computing devices 180a-180m authenticate themselves to the client domain network via other mechanisms, e.g., Kerberos. Authentication and logon via the PKI of the present invention is discussed further below.

As previously stated, network traffic between client computing devices 180a-180n and the components forming client domain services system 175 is controlled by network data switch 177. Network data switch 177 prevents client computing devices 180a-180n from communicating directly with one another and further prevents the components forming client domain services system 175 from communicating with filtering router 174.

Filtering router 174 is logically interposed between client domain network data switch 177 and a wide area network such as trusted network 160 and, in certain embodiments of the present invention, is configured to allow only certain network traffic to pass therethrough. In certain embodiments, only VPN traffic is allowed through filtering router 174, e.g., UDP port 500, protocol 50 and UDP port 1701 traffic. Additionally, filtering router 174 may allow only those traffic packets that are addressed either from the perimeter network 150 to the client domain network 170, or vice versa. Traffic addressed to all other network locations may be disallowed from passing through filtering router 174.

Trusted network backbone 160 may be a wide area network, or even a local area network, on which only trusted, enterprise data is allowed. Trusted network 160 may be a dedicated communications line, such as a leased T1 communications line or a local Internet backbone. As trusted network backbone 160 may carry communication packets from client domain network 170 to one or more data centers 110, 120, 130, or vice versa, that data must remain secure on the public network 160. This is assured by the use of the virtual private network established between the client domain and the data centers 110, 120, 130 via both encrypted and encapsulation. Thus, sensitive data is maintained at an acceptable security level even when traversing a public or semi-public network infrastructure.

Figure 5:
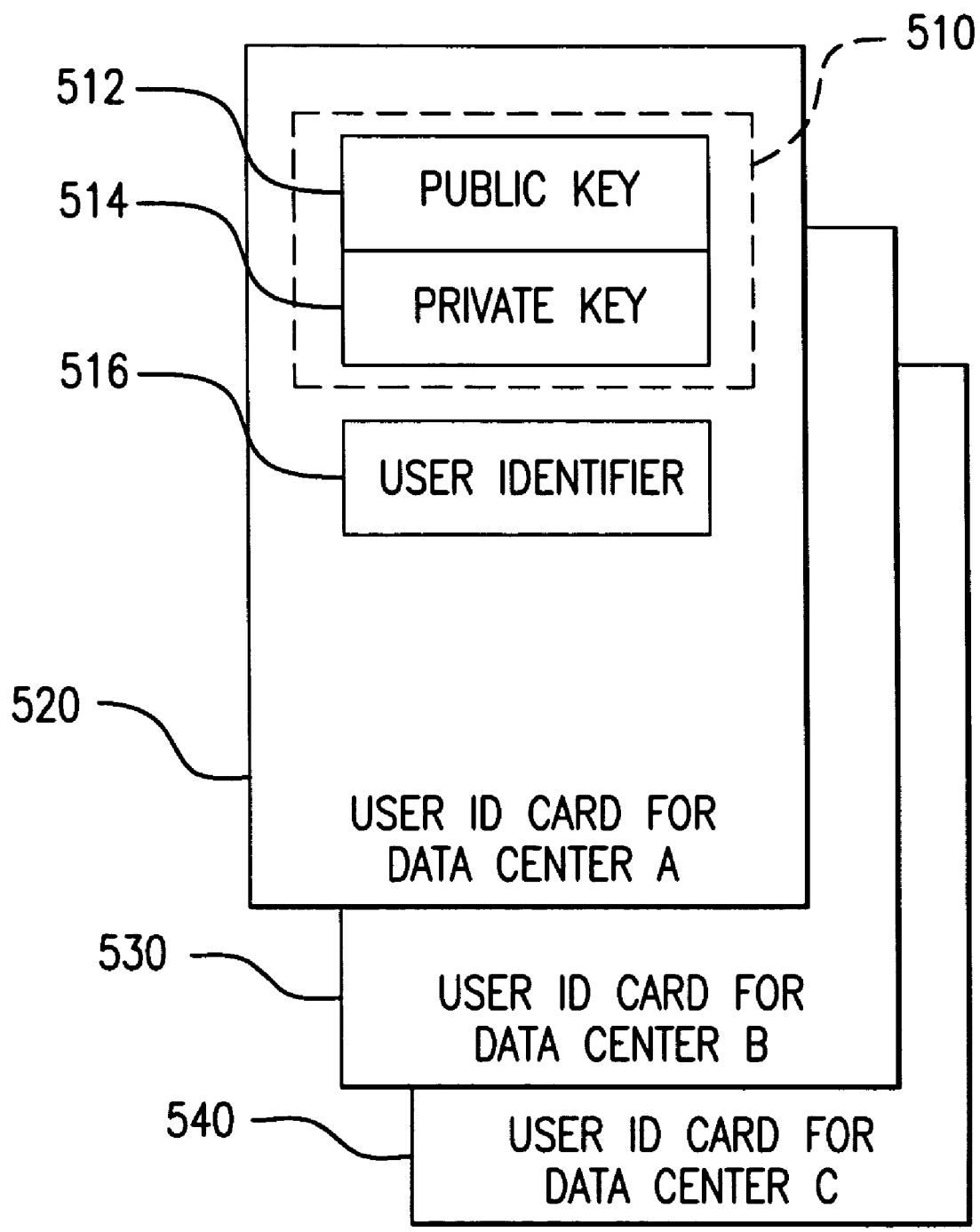
FIG. 5 is a block diagram of user identification carrier of the present invention.

As previously stated, the PKI of the present invention requires that both the client machine 180a-180n and the user of that machine be authenticated. Thus, the certificate authority from each data center must provide a certificate to the client machine 180a-180n as well as to the user. The issued machine certificates are stored on each client device as stated above. In certain embodiments of the present invention, the user certificates are stored on smartcards, or some other identification carrying means, such as illustrated in FIG. 5. The user is issued a certificate for each data center 110, 120, 130 for which he is allowed access. In the example of FIG. 5, a user has been issued three ID cards: an ID card 520 for data center A, ID card 530 for data center B, and an ID card 540 for data center C. Each ID card 520, 530, 540 has inalterably stored thereon a certificate 510 issued from the corresponding data center's certificate authority. In certain embodiments of the present invention, certificate 510 includes a public key 512 and a private key 514, each being 1024 bits in length.

Also stored on ID cards 520, 530, 540 is a corresponding user identifier such as user personal identification number (PIN) 516. The user's knowledge of the correct PIN, and entry of the PIN upon insertion of the smartcard into a smartcard reader, prevents the unauthorized use of the user certificate stored on the ID card 520, 530, 540. In certain embodiments of the invention, the PIN 516 is replaced with biometric data such as fingerprint or retinal scan data. It should be clear that appropriate biometric capturing equipment must be deployed both during certificate issuance and authentication when biometric data are used as the user identifier.

Figure 6A:
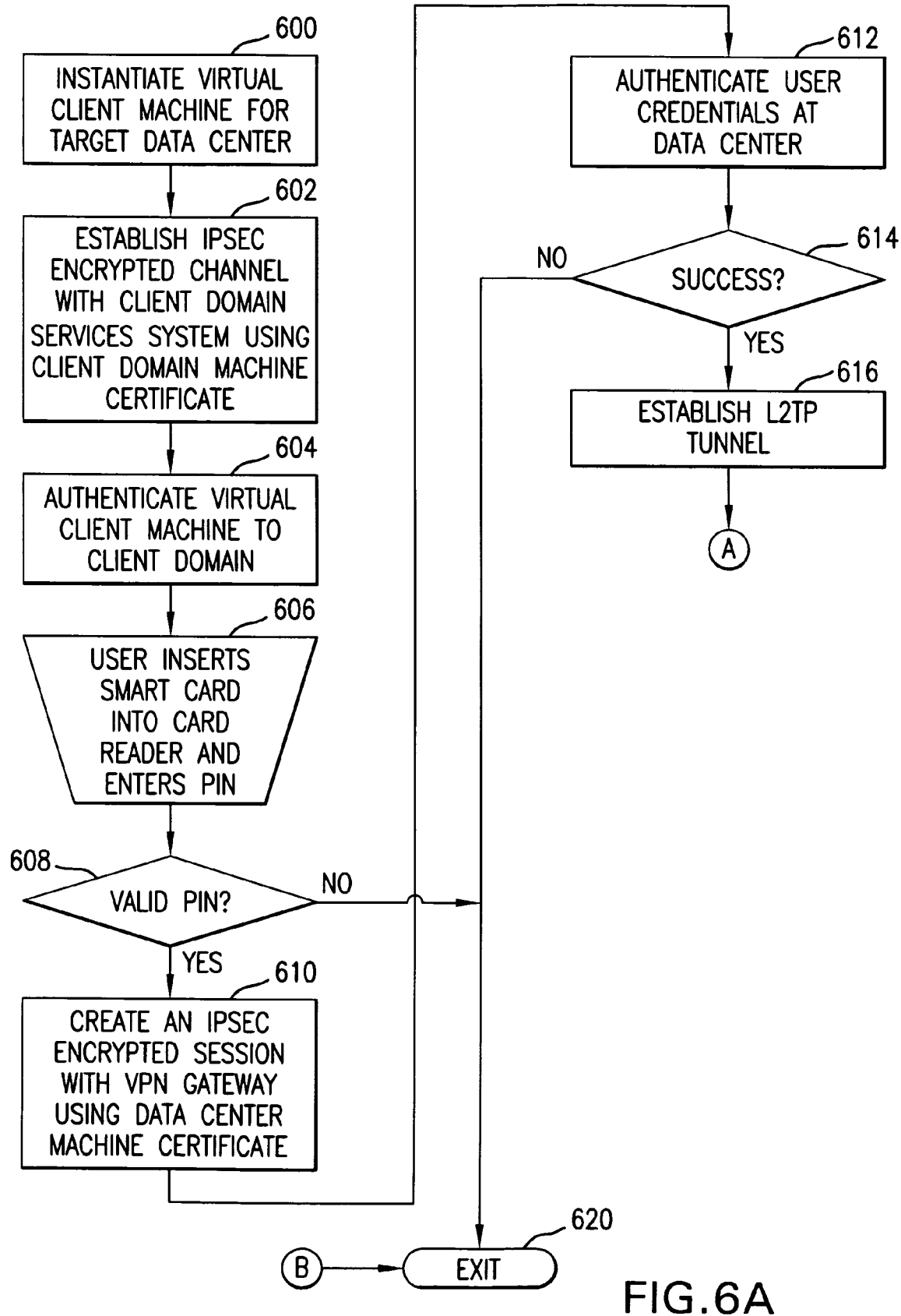
FIGS. 6A-6B are flow charts illustrating the key steps in a secure computing session as implemented by the present invention.
Figure 6B:
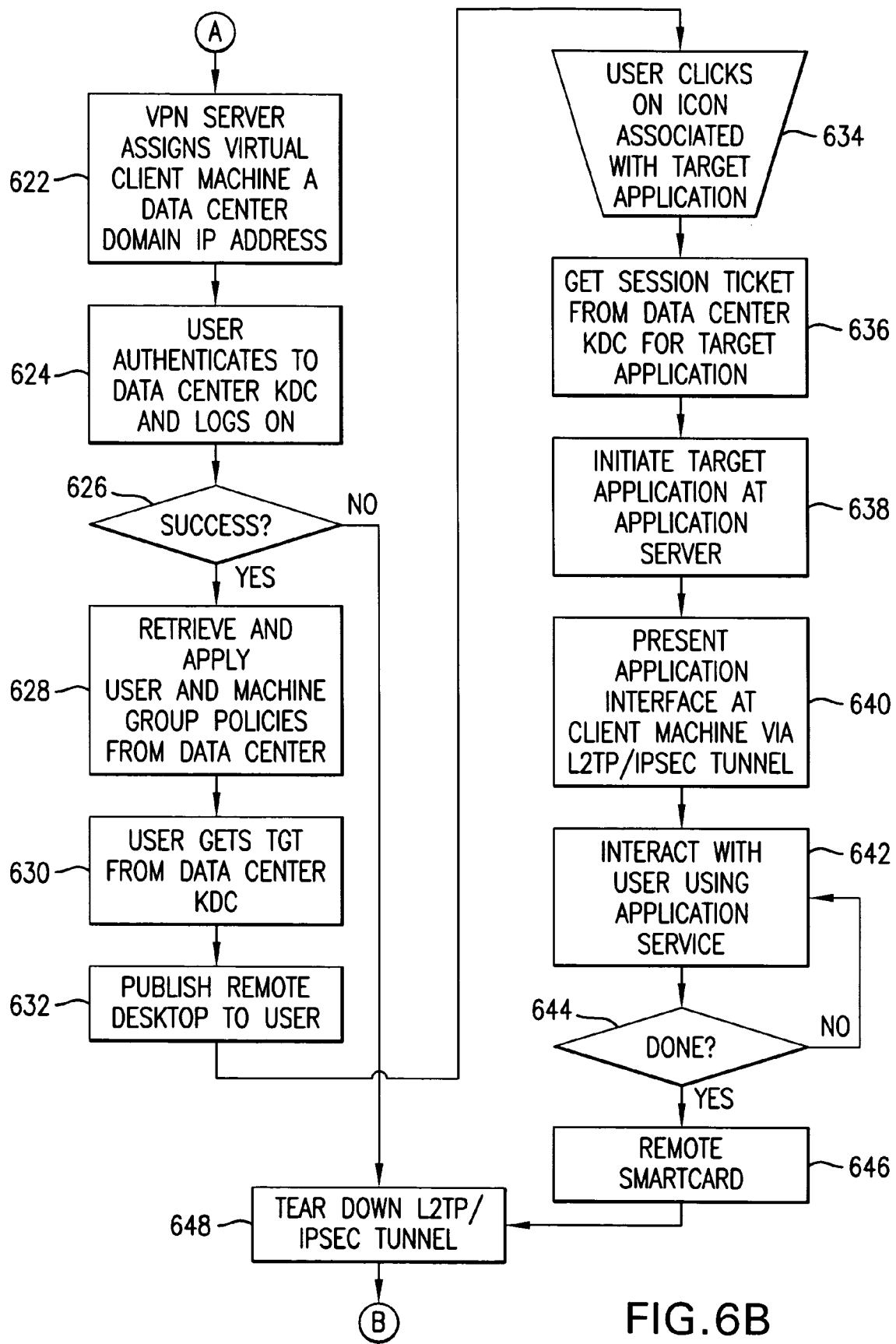

FIG. 6 illustrates the process flow of an exemplary user session as would be implemented by certain embodiments of the present invention. It should be noted that the method steps of FIGS. 6A-6B need not be performed in the depicted order and that all process steps need not be performed for every embodiment. However, as previously stated, in accordance with aspects of the present invention, a VPN is to be established prior to the user having access to and performing operations on the application server 250. The user session of FIGS. 6A-6B provides an example of creating a VPN from the client machine to the VPN server of a target data center and then subsequently initiating an application service session.

The process depicted in FIGS. 6A-6B begins at block 600 where a user instantiates a virtual client machine 350a-350m (for purposes of the remainder of this discussion, the subject virtual client machine will be referred a virtual client machine 350 for simplicity. It should be understood that the following discussions applies equally to any virtual machine 350a-350m ) of thin client device 180a-180n (for purposes of the remainder of the present discussion, the subject thin client device 180a-180n will be referred to as thin client device 180). The instantiation of virtual client machine 350 is a user initiated application of embedded operating system 335. In certain embodiments where the embedded operating system implements a graphical user interface (GUI), such as Microsoft® Windows® XPe, virtual client machine instantiation may be an action executed by selection of a menu item, e.g., under the Microsoft® Windows® XPe "Start" button.

Each virtual client machine instance is, as previously described, a copy of a virtual machine image 341 held in persistent storage of thin client device 180. Thus, each virtual client machine maintains a copy of machine certificates from all applicable data centers as well as a machine certificate from the client domain. However, the newly formed virtual client machine must be able to show that it is a member of a domain trusted by a particular data center before a virtual private network between the thin client device 180 and the VPN gateway server 117, 127, 137 of the particular data center can be established. To be able to demonstrate the trust relationship, the virtual client machine must first authenticate itself to the client domain.

As all communication to client domain services system 175 must be conducted over an encrypted channel, as prescribed by certain embodiments of the present invention, the virtual client device 180 negotiates an IPSec security association (SA) with the client domain services system 175 using the copy of the client domain machine certificate inherited from guest OS image 341. The security negotiation may proceed in accordance with any known protocol, such as the well-known Internet Key Exchange (IKE) protocol. If the IPSec SA is successfully established, an IPSec encrypted session is created between the virtual client machine 350 and domain control services system 175, as shown at block 602.

The user session process flow continues at block 604, whereby the virtual client machine 350 authenticates itself to client domain services system 175. The authentication may be executed by known means, such as Kerberos. However, at the conclusion of the authentication cycle, the virtual client machine 350 must have credentials showing that it is a member of the client domain network 170. There are many known methods for demonstrating this membership.

Once a virtual client machine 350 has been instantiated, the user may insert a smartcard 520, 530, 540 into a smartcard reader 325a, 325b on thin client device 180, as shown at block 606. The user then enters his Personal Identification Number (PIN) to unlock the contents of the smartcard, i.e., to allow access to the user's data center domain certificate 510. If the PIN has been entered correctly, as determined at decision block 608, an IPSec encrypted session is created between the virtual client machine 180 and the VPN gateway of the target data center domain 110, 120, 130 using the data center machine certificate, as shown at block 610. The target data center domain is determined from the user's data center certificate 510, i.e., the issuer of the certificate is designated as the target data center.

The user session process of FIG. 6A continues at block 612, whereby he authenticates himself to the target data center 110, 120, 130 using the user's data center certificate 510 over the IPSec channel established its block 610. In certain embodiments of the present invention, the authentication is performed via AAA service transactions between the virtual client machine 180 and the VPN gateway server 117, 127, 137 of the target data center network 110, 120, 130.

If the user, in operational custody of thin client device 180 executing the virtual client machine 350 which is a member of client domain network 170, is successfully authenticated to the VPN gateway 117, 127, 137 of the target data center domain 110, 120, 130, as determined at block 614, an L2TP/IPSec tunnel is established between virtual client machine 350 and the VPN gateway server 117, 127, 137, as illustrated at block 616. If the authentication fails, the logon process is terminated via exit block 620.

The exemplary user session process continues at block 622 of FIG. 6B, whereby a target data center domain IP address is assigned to the virtual client machine 350 via the VPN gateway server 117, 127, 137. The IP address assignment may be performed through any known means, e.g., the VPN gateway server contacting the target data center domain's DHCP server 230 for an available IP address. The virtual client machine 350 is thereby logically coupled to the target data center 110, 120, 130.

The user session continues at block 624, whereby the user authenticates himself, via his user certificate to the data center's KDC 280 for the purposes of logging on to the data center. If the authentication and logon are successful, as determined at block 626, the data center policy regulator 245 retrieves and applies the user's group policies, as shown at block 628, per well-established means. A discussion of an exemplary policy configuration was discussed hereinabove, as shown at block 628. Additionally, the virtual client machine 350 is issued a TGT from the KDC of the target data center network. Further, once the user has been authenticated, the data center publishes a remote desktop 360a-360m (for purposes of this discussion, the remote desktop will be referred to as remote desktop 360, where it should be understood that the remote desktop 360 is actually the respective remoted desktop 360a-360m corresponding to the virtual client device 350a-350m being referred to as virtual client 350), as shown at block 632, in accordance with the user's assigned profile previously described. As previously stated, the remote desktop 360 appears to the user as it would were it a locally generated desktop.

The process continues at block 634, whereby the user attempts to launch an application on the target data center application server 250. This may be accomplished by known means such as by clicking on an icon associated with the application displayed on remote desktop 360 with an input device such as a mouse. As in certain embodiments of the present invention, the application server 250 requires a separate logon. In such instances, a Kerberos session ticket for this purpose is retrieved from the data center KDC, as shown at block 636. The session ticket is presented to the application server 250, is logged thereon and the selected application is launched, as depicted at block 638.

In certain embodiments of the present invention, the user may interact with the application server 250, i.e., execute programs thereon, without requiring a separate Kerberos ticket for each program when selected for executions by the user. That is to say, when the user has successfully logged on to application server 250 responsive to the execution of the first application, the user remains logged on for the duration of the user session. This allowance mitigates system latency associated with a Kerberos transaction for each instantiation of a computer application.

As the selected program executes, an application interface is presented to the user, as shown at block 640. As previously stated, the application interface is, in certain embodiments of the present invention, transmitted to the virtual client machine 350 as an image, or series of images, over the L2TP/IPSec tunnel. Additionally, the application interface appears to the user, in both function and appearance, as it would were the application being executed in the thin client device 180.

In certain embodiments of the present invention, more than one virtual client machine 350a-350m may be simultaneously connected to separate data centers 110, 120, 130. Selection of operational focus, i.e., which virtual client machine 350a-350m is active ion the user interface of thin client device 180, may be achieved through well known means, such as by clicking on an icon or window corresponding to the desired virtual client machine 350a-350m. The selected virtual client machine 350a-350m may then receive input from the user an subsequently pass that input to the application server 250 via the corresponding VPN as described above. Reception of data from an application server 250 to its associated virtual client machine 350a-350m having user focus may occur as a background operation, as is well known in the virtual machine art.

As shown at blocks 642 and 644, the user continues to interact with the application server 250 through remote desktop 360 until he has completed his tasks. The user may terminate his session by simply removing his smartcard 520, 530, 540 from card reader 325a, 325b, as shown at block 646. When this is done, the VPN connection is terminated, the L2TP/IPSec tunnel is broken down, as shown at block 648, and the session is terminated at block 620 of FIG. 6A.

Figure 9:
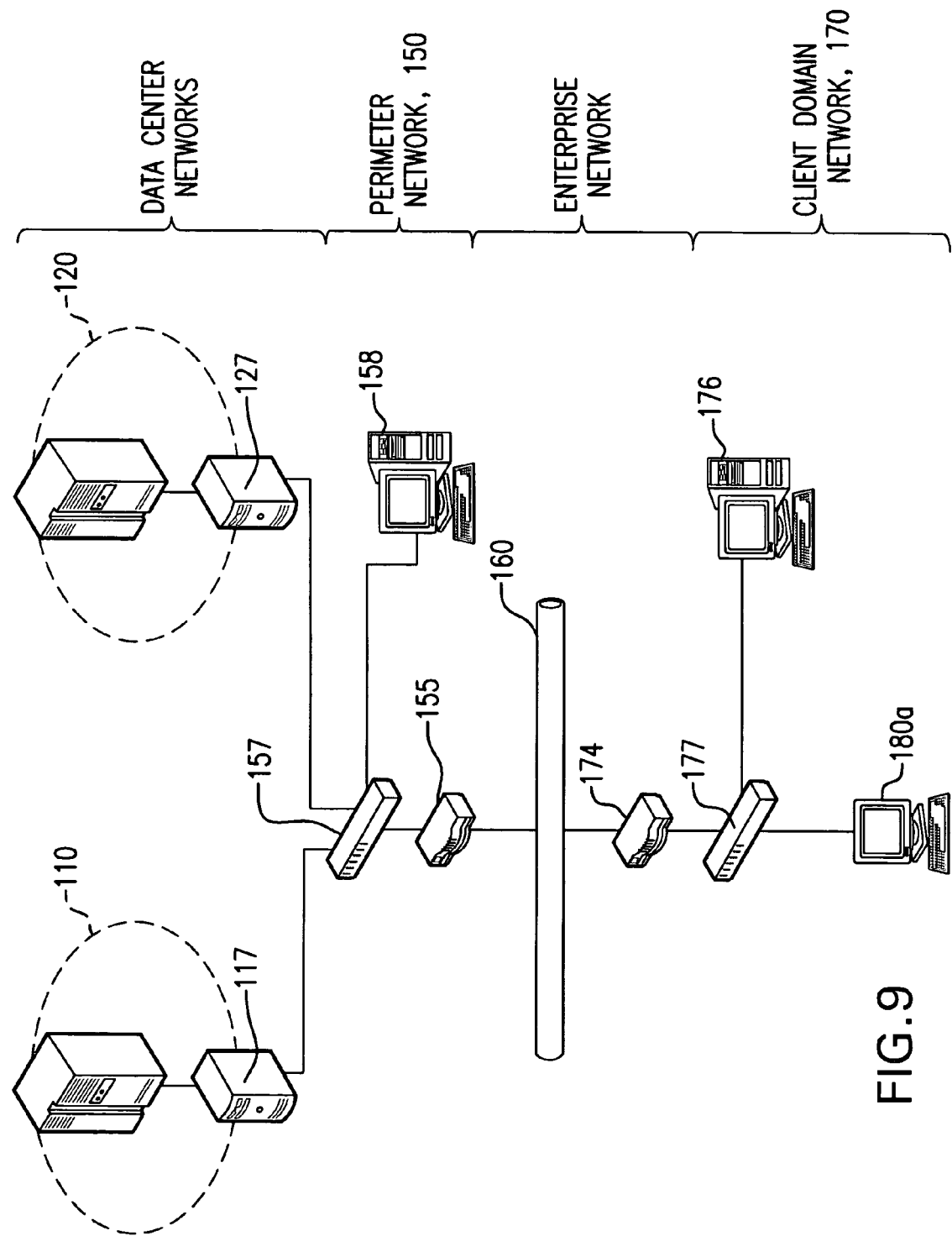
FIG. 9 is an illustration of a simplified embodiment of the present invention for the purposes of demonstrating the effectiveness thereof.

Having now described the various components of the secure computing system of the present invention, an exemplary system configuration providing a Defense in Depth security solution will now be presented with reference to FIG. 9 and FIGS. 1-6. In the example of FIG. 9, only one thin client device 180a will represent any of the client computing devices 180a-180n. In subsequent discussions, i.e., the attack scenarios of FIGS. 10A-10E, when more than one thin client device is shown, it will be configured the same as client computing device 180a of FIG. 9, except where otherwise indicated (e.g., a rogue thin client may be a thin client modified in some way in order to attempt to defeat the D-in-D architecture).

Further in the exemplary embodiment of FIG. 9, only two data center networks 110, 120 are shown for simplification of the discussions that follow. It should be clear to the ordinarily skilled artisan that any number of data centers may be incorporated into the secure system of the present invention by configuring additional data centers as described above.

In the exemplary embodiment of FIG. 9, a two-way trust must exist between each data center 110, 120 and the client domain 170 in order for a VPN tunnel to be established. Thin client machine 180a has inalterably stored thereon a machine certificate for each data center 110, 120 as well as a machine certificate for the client domain 170. Additionally, each user has a user logon certificate inalterably stored on a smartcard for each data center domain 110, 120. Furthermore, each data center, as well as the client domain, has its own certificate authority for issuing the machine certificate and a user certificate. The above measures constitute an exemplify a public key infrastructure (PKI) of the present invention.

In the exemplary embodiment, all virtual private network (VPN) connections are made over L2TP/IPSec tunnels using 256 bit encryption in accordance with the Advanced Encryption Standard (AES) from the client machine 180a to a virtual private network gateway of a target data center. Filtering routers 155 and 174 have network traffic filters configured such that only traffic of type UDP port 500 (IKE), protocol 50 (ESP) and UDP port 1701 (L2TP), protocol 50 (ESP) are allowed to pass through the respective router.

Client domain filtering router 174 is configured to drop all Internet Protocol (IP) packets having a source address not equal to the perimeter network filtering router 155 (when receiving traffic from the data center side) or not equal to the client machine 180a (when sending traffic to the data center side). Additionally, client domain filtering router 174 will forward packets only to perimeter network filtering router 155 (when sending data from client machine 180a) or only to client machine 180a (when receiving data from the perimeter network 150). Similarly, perimeter network filtering router 155 is configured to drop all IP packets not addressed from client domain filtering router 174 or not addressed from one of the VPN gateway servers 117, 127. Also, perimeter network filtering router 155 will forward packets only to client domain filtering router 174 or one of VPN gateway server 117, 127.

The LAN switch 157 in the perimeter network 150 is configured to block any direct IP connection between VPN gateway servers. Additionally, network monitor 158 is connected to a promiscuous port on LAN switch 157. The network monitor 158 detects and reports all traffic on the perimeter network 150 that is not of type UDP port 500 or UDP port 1701, protocol 50, and all traffic not addressed between one of VPN gateway servers 117, 127 and filtering router 155.

The thin client device 180a has been provisioned with an embedded operating system and the necessary components to provide an interface to an application server as described above. Additionally, the thin client device 180a has no local user account and the only administrator account has been removed. Thus, a user has no local account in which to logon. Additionally, the client domain computing device 180a is configured to disallow any logon to the local machine by permanently and inalterably enabling a "logon using dial up/VPN connection" setting in the embedded operating system.

Each thin client device has no external storage media, nor provision to accept external storage media. Additionally, each thin client device has a write filter which prevents all applications from writing to non-volatile internal storage, i.e., flash RAM.

The virtual machine manager of the thin client device runs isolated virtual machines, a VPN connection for which is activated by a virtual universal serial bus (USB) connection when a user inserts a smartcard into a card reader on the thin client device. The USB connection is terminated when the smartcard is removed. Removal of the smartcard from any card reader invokes a log off procedure in which the VPN tunnel to the associated data center is broken down and all memory allocated to the virtual machine corresponding to the data center is erased.

The embedded operating system on the client computing device 180a includes an application service client, as described above. The application service client is configured to prohibit receiving data from the embedded operating system's clipboard. This eliminates the possibility of pasting data onto an application service client in an attempt to transfer data out of a data center security zone. In many commercially available application service clients, cut-and-paste operations are controlled via operational settings applied by an administrator.

The internet connection firewall 337 of the embedded operating system in client computing device is configured to drop all unsolicited network traffic arriving thereat with the exception of remote desktop traffic. In certain commercially available operating systems, such as Microsoft® Windows® XPe, the exclusion of unsolicited traffic via the internet connection firewall included therein is an option, which, in the exemplary embodiment, is selected by the administrator prior to the removal of the administrator account. The administrator may also define exceptions to the unsolicited traffic rule, such as allowing unsolicited incoming traffic from a remote desktop.

The client domain services system 175 requires IPSec authentication on all communications except for DNS and DHCP. Additionally, the client domain services system 175 has no shared storage.

The trust reference table 410 in the client domain network 170 contains only two-way trusts between the client domain and applicable data centers. No other domains are entered.

A local user group policy prohibits access to all non-volatile storage devices. Additionally, the client domain computing devices 180 are assigned to a client computer organizational unit whose computer group policy denies logon to the administrator security group of client domain services system 175.

An application server organizational unit user group policy is in a loopback mode which overrides all other policy settings. The application server organizational unit user group policy further prohibits thin client users from accessing all non-volatile media within the client computing device 180a.

Log files in each data center 110, 120 capture all privilege abuses and reverse attempted changes to system settings by means widely available in the art. All privileged abuses are alerted to an appropriate security officer.

A management feature of the application server prohibits user drive mapping for all thin client users. All user data must be stored in the data center's directory service 270. All thin client desktops are covered by the application service and are transmitted to the thin clients as images of a user interface. No raw data, i.e., non-image data, is transferred out of its data center.

The client domain network 170 and the data center domain networks 110, 120 are configured as above such that the exemplary user session and logon procedure described with reference to FIGS. 6A-6B is required to initiate a VPN connection and subsequent remote computing operations between thin client device 180a and the target data center 110, 120.

Figure 10A:
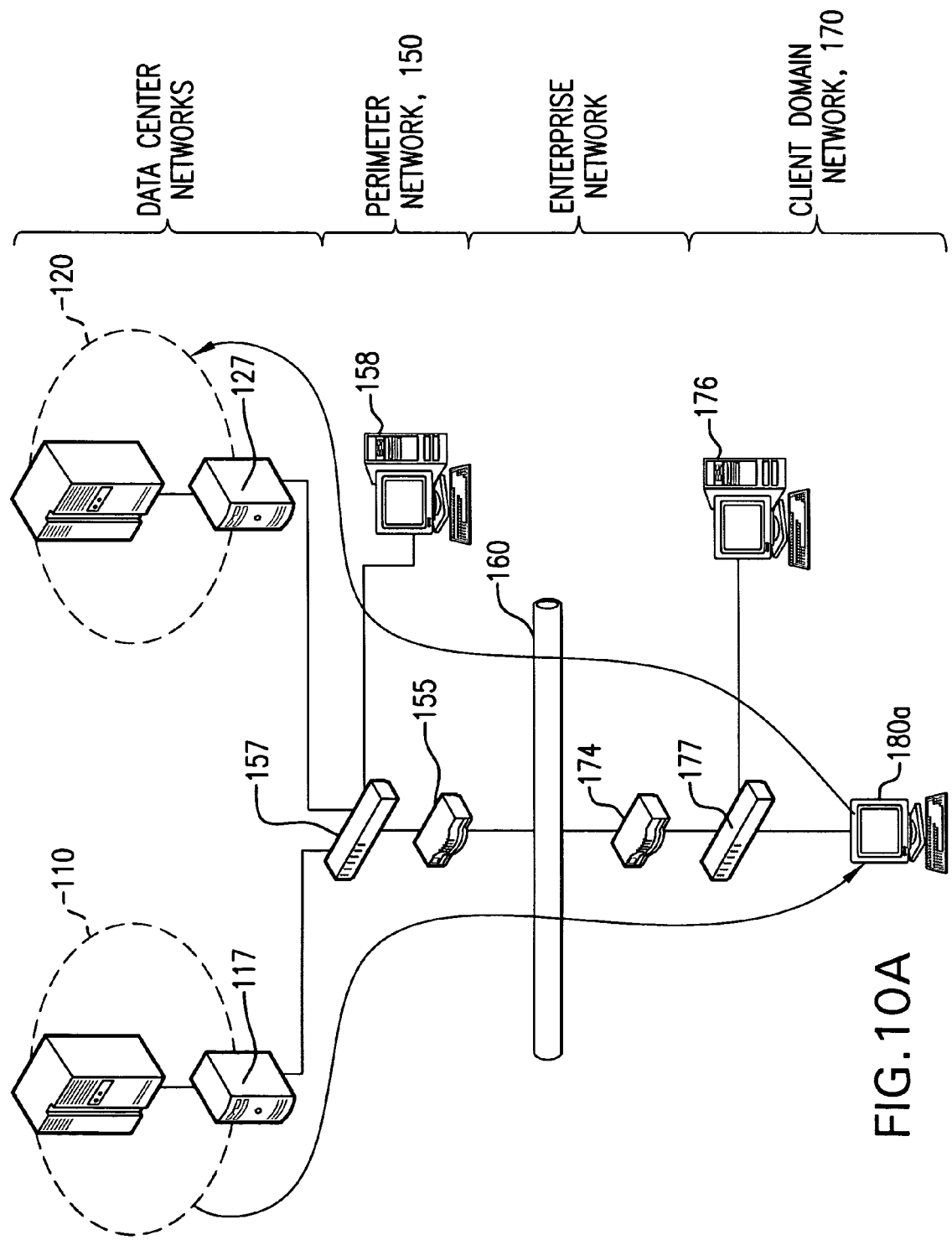
FIGS. 10A-10D are illustrations of network attack scenarios and the defense thereto in accordance with the present invention.

The effectiveness of the Defense in Depth architecture of the present invention will be demonstrated by way of the following examples. Referring first to FIG. 10A, assume that a thin client user has attached a specially configured client computing device 180a to the client domain network in an attempt to transfer high security domain data to the low security domain 120. This attempt would fail because the specially configured client computing device lacks the appropriate machine certificates to authenticate itself to both the low security domain and the high security domain. Without valid machine certificates, the rogue thin client will not be able to establish a VPN tunnel to either security domain. Since only VPN tunnel traffic is allowed between filtering routers 155 and 174, not only would all non-tunnel traffic be dropped, but the user credentials could not be authenticated to either virtual private network gateway 117, 127. Additionally, the user lacks the client network domain administrator credentials in an attempt to bypass machine authentication to the client domain services system 175. Thus, as the rogue thin client machine prove itself as a member of the client domain network 170, it cannot authenticate itself to the client domain for Kerberos credentials and thereby logon to either low security domain or high security domain.

Figure 10B:
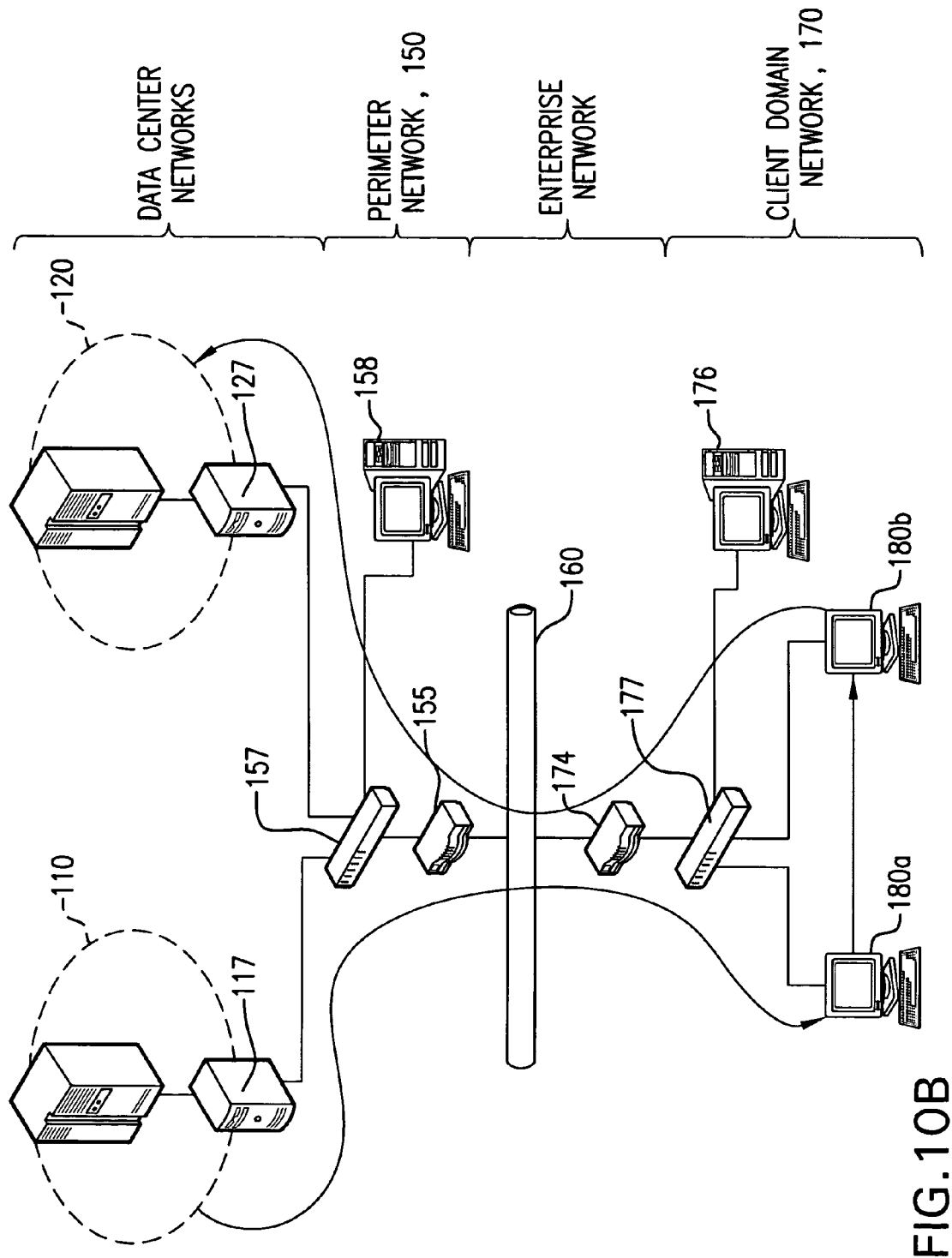

Consider next the attack scenario of FIG. 10B in which one or more thin client users make connections to the high security domain 110 and the low security domain from two thin client devices 180a and 180b. The users attempt to establish communications with one another using an intra-domain conferencing application such as NetMeeting (installed as an embedded application associated with an installed web browser). The users then attempt to transfer high domain information to the low security domain 120 through application sharing. In such an attack, the first line of defense lies in that the thin client desktop configuration and the high security domain user group policy and the low domain user group policy do not permit users interactive access to a conferencing application. This is controlled through the policy and profile settings of each of security domains 110, 120. Users do not have access to any other local application that might be used to directly communicate with one another on the same client network. Additionally, the Internet connection firewall of the embedded operating system may be deployed to insure that all intra-domain conferencing application invitation packets (i.e., unsolicited traffic) are blocked. Furthermore, the users have no actual knowledge of the IP addresses being used on the client network, which makes it extremely difficult to establish an intra-domain conferencing application between them.

Figure 10C:
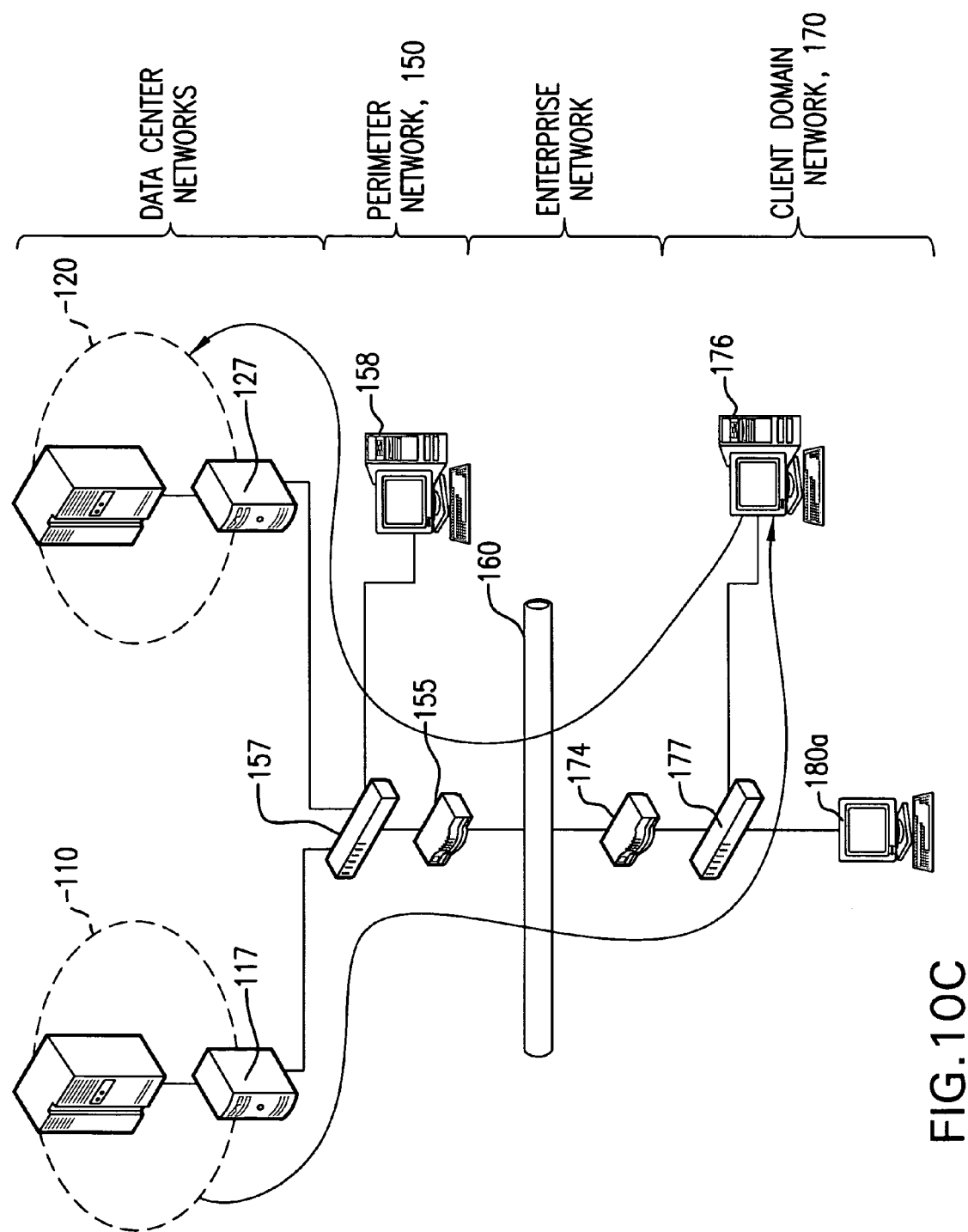

Referring now to FIG. 10C, another attack scenario is illustrated where a thin client user logs on normally to the high domain 110 and then attempts to save high domain data on the storage facility of client domain services system 175. The user then logs on to the low security domain 120 and attempts to retrieve the high domain data from the storage of client domain services system 175 and transfer that data to the low security domain 120. This attack is prevented in that, first, the thin client desktop configuration, the low security domain user group policy and the high domain user group policy do not permit users to establish a network connection to the client domain services system 175. Even if such a connection were to be established, the client domain control server computer has no shared storage that could be used as an intermediate storage device. If, somehow, a network connection wizard could be invoked to a share on the client domain directory server 470, the thin client user lacks the client domain services system administrator user name and password to authenticate the connection. Additionally, the application server drive mapping is disabled and thereby, the thin client user has no way to establish a path to the client domain control server share.

Figure 10D:
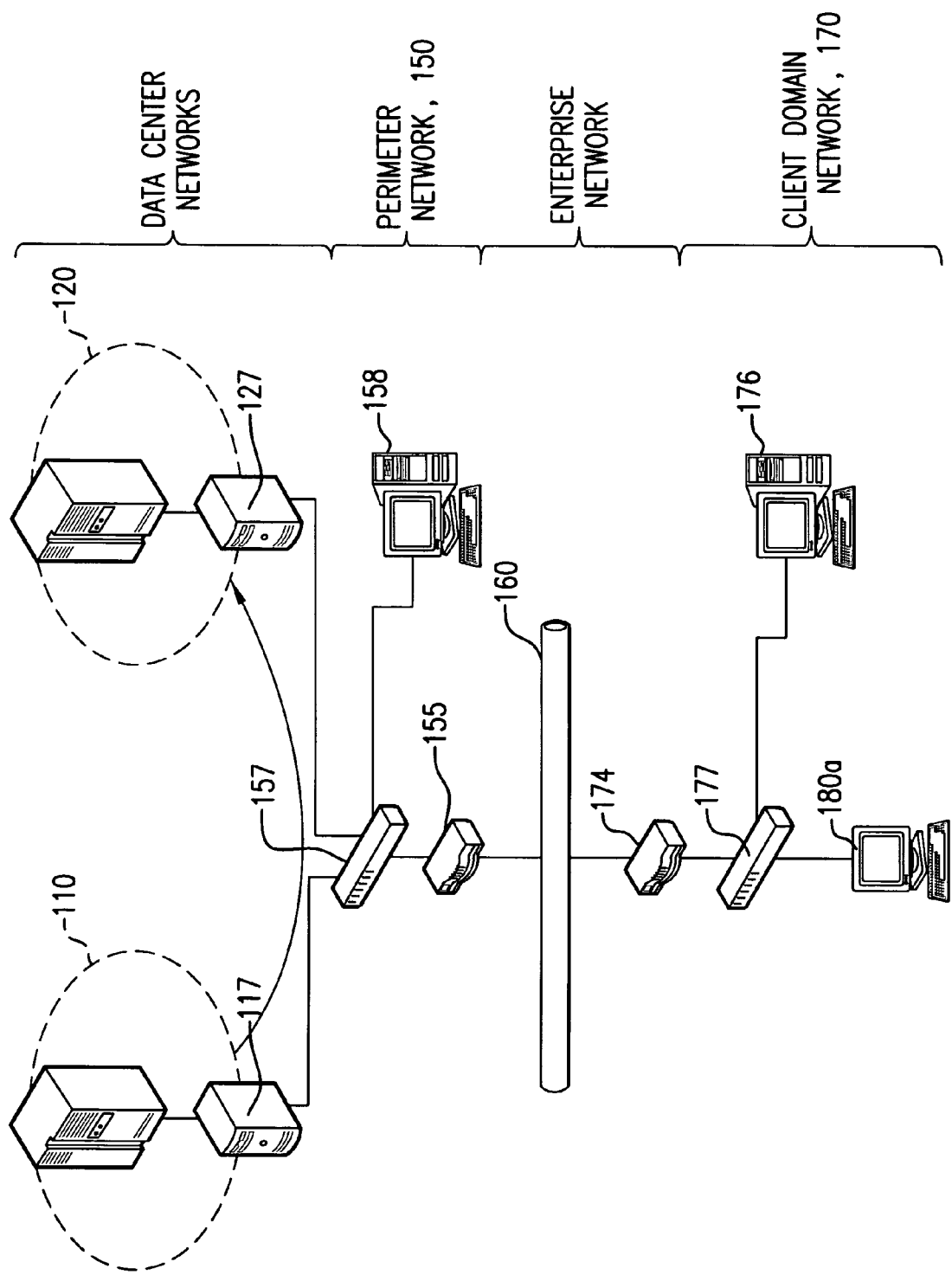

A further example of the effectiveness of the defense-in-depth architecture of the present invention is made by way of FIG. 10D. In this scenario, the low security domain virtual private network system administrator and the high domain virtual private network system administrator reconfigure their virtual private network gateways to accept unencrypted, non-authenticated connections to one another. The low and high security domain VPN system administrators attempt to establish a VPN tunnel between their devices. The low and high security domain VPN system administrators then attempt to transfer data from the high security domain to the low security domain. In a first line of defense, log files, inaccessible to the respective administrators, would capture the virtual private network reconfiguration privilege abuses and report the abuses to the appropriate security officer. In the meantime, the perimeter network virtual LAN switch 157 blocks any direct Internet protocol connectivity between VPN gateway servers 117, 127. Furthermore, the network monitor on the LAN switch 157 promiscuous port detects and reports the prohibited gateway-to-gateway packet traffic if the virtual private network gateway system administrators reconfigure their servers to communicate directly with one another.

The unique combination of public key infrastructure (PKI), virtual private networking (VPN), service side application service and thin client machine technology provides a low cost—easily maintained security architecture through a Defense in Depth architecture of COTS components. This has been shown by way of the examples of FIGS. 10A-10D. However, other attack scenarios are defended against by the D-in-D architecture of the present invention, as can easily be ascertained by the ordinarily skilled artisan.

Although the present invention has been described herein in conjunction with specific embodiments thereof, many alternatives, modifications and variations will be apparent to those skilled in the art. The present invention is intended to embrace all such alternatives, modifications, and variations that fall within the spirit and broad scope of the appended Claims.

What is claimed is:

1. A system for secure computing by a user at a client communication network communicating with at least one of a plurality of remote data centers respectively coupled to a corresponding one of a plurality of data center communication networks, the system comprising:
   a defense-in-depth architecture, including:
      at least one client computing device providing a local user interface on the client communication network to said at least one of the plurality of remote data centers;
      said at least one client computing device being adapted for:
         executing on a local processor and in a local memory thereof an embedded operating system and an embedded set of computer applications,
         prohibiting local execution of any computer applications other than said embedded operating system and said embedded set of computer applications,
         prohibiting persistent storage in said local memory of any user data and of any data produced by said embedded set of computer applications, and
         prohibiting alteration of any operating parameters of said embedded operating system;
      public key infrastructure means for authenticating identities of the user and of said at least one client computing device to a remote data center to which access by the user is requested, said public key infrastructure means including:
         a client domain services system coupled to said client communication network to receive the identity of said at least one client computing device inalterably stored thereon and to authenticate said at least one client computing device to said client communication network upon successful authentication of said identity of said at least one client computing device, said client domain services system being prevented from remote access by entities outside said client communication network, said access to said remote data center being granted only upon successful authentication of said both identities of the user and said at least one client computing device;
      virtual private networking means for:
         establishing a virtual private network between said at least one client computing device and one of the plurality of data center communication networks only upon said successful authentication to a corresponding one of the at least one of the plurality of remote data centers coupled thereto;
         conducting network data packets respectively between said at least one client computing device and a corresponding one of the plurality of data center communication networks respectively over a corresponding one of a plurality of said virtual private networks; and
         encrypting said network data packets via a predetermined encryption algorithm; and
      server-based computing means for:
         remotely executing computer applications at said at least one of the plurality of remote data centers; and
         transmitting execution status of, and receiving user input to, said computer applications via said local user interface, said execution status being transmitted, and said user input being received, only over said corresponding one of said plurality of virtual private networks.

2. The system for secure computing as recited in claim 1, wherein said public key infrastructure means further includes another authentication system respectively coupled to each of the plurality of data center communication networks for respectively authenticating both said at least one client computing device and the user thereto.

3. The system for secure computing as recited in claim 2, wherein said another authentication system is respectively adapted to prohibit said successful authentication to said corresponding data center communication network if said at least one client computing device is not authenticated by said client domain services system to said client communication network.

4. The system for secure computing as recited in claim 2, wherein said another authentication system includes a certificate authority respectively associated with a corresponding one of the plurality of data center communication networks for respectively issuing a certificate on behalf thereof to corresponding one of the user and said at least one client computing device, said certificate providing proof of authenticity of said identities of the user and of said at least one client computing device, respectively, to said corresponding data center communication network.

5. The system for secure computing as recited in claim 2, wherein said client domain services system includes a certificate authority associated with the client communication network for issuing a certificate on behalf thereof to said at least one client computing device, said certificate providing proof of authenticity of said identity of said at least one client computing device to said client communication network.

6. The system for secure computing as recited in claim 1, wherein said embedded set of computer applications includes a virtual machine monitor application for establishing a virtual machine executed on said embedded operating system.

7. The system for secure computing as recited in claim 6, wherein said embedded set of computer applications includes an application service client application for receiving said execution status from, and transmitting said user input to said server-based computing means.

8. The system for secure computing as recited in claim 7, wherein said application service client application is executed on said virtual machine.

9. The system for secure computing as recited in claim 1, wherein said data packets encrypted by said encryption means are further encapsulated in a data packet having an unencrypted packet header.

10. The system for secure computing as recited in claim 9, wherein said virtual private networking means includes packet filter means for excluding from said private network traffic all of said data packets except said encapsulated data packets.

11. The system for secure computing as recited in claim 10, wherein said virtual private networking means includes a gateway server means respectively coupled to each of said plurality of data center communication networks controlling access thereto via said virtual private network.

12. The system for secure computing as recited in claim 11, wherein said packet filter means includes a filtering router coupled to said gateway server means of each of said plurality of data center communication networks.

13. The system for secure computing as recited in claim 11, wherein said packet filter means includes a filtering router coupled to said client communication network.

14. A system for secure computing between a user and at least one remote communication network, comprising:
 a defense-in-depth architecture, including:
 a user identification carrier for inalterably storing a set of user credentials;
 a client domain network including:
  a client computing device for providing to the user an interface to the secure computing system, said client computing device including:
   a microprocessor, a network interface circuit and local internal memory;
   a set of machine credentials inalterably stored in said local internal memory;
   an identification reader for retrieving said set of user credentials from said user identification carrier;
  a client domain services system coupled to said client computing device to receive said set of machine credentials therefrom and to authenticate said at least one client computing device to said client domain network upon successful authentication of said set of machine credentials, said client domain services system being prevented from remote access by entities outside said client domain network,
  an embedded operating system inalterably stored in said local internal memory, said operating system including a set of operating parameters and prohibiting user access to said local internal memory by at least one of said operating parameters, wherein said client computing device is adapted to prohibit alteration of said set of operating parameters by the user;
  at least one virtual private network client executable on said embedded operating system, each of said at least one virtual private network client transmitting network traffic to, and receiving network traffic from, a corresponding one of the at least one remote communication network over a corresponding virtual private network; and
  at least one application service client executable on said embedded operating system, said application service client providing a user interface to a remotely executed computer application; and
 a perimeter network interposed between said client domain network and the at least one remote communication network, said perimeter network configured to allow transmission of only network traffic of a predetermined type and prohibiting transmission of any network traffic bound to one of the at least one remote communication network directly from any other one of the at least one remote communication network;
 a virtual private network gateway server installed on each of the at least one remote communication network for providing a terminus to said virtual private network corresponding therewith;
 a server domain control server installed on each of the at least one remote communication network for controlling access thereto in accordance with a combination of both a first subset of said set of user credentials and a first subset of said set of machine credentials, said server domain control server being adapted to prohibit successful authentication of said client computing device to said at least one remote communication network if said client computing device is not authenticated by said client domain services system to said client domain network;
 a directory server installed on each of the at least one remote communication networks and accessible to the user only through said virtual private network gateway server for providing remote storage of user data; and
 an application server installed on each of the at least one remote communication network and accessible to the user only through said virtual private network gateway server for executing thereon user computer applications, for providing remote storage of said user computer applications and for transmitting user interface data to, and receiving user input from, a corresponding one of said at least one application service client.

15. The system for secure computing as recited in claim 14, wherein said client domain network includes a certificate authority for issuing a client domain machine certificate to said client computing device.

16. The system for secure computing as recited in claim 15, further comprising a certificate authority respectively installed on each of the at least one remote communication network for respectively issuing a corresponding server domain user certificate to the user and a corresponding server domain machine certificate to said client computing device.

17. The system for secure computing as recited in claim 16, wherein said first subset of said set of user credentials includes said server domain user certificate and said first subset of said set of machine credentials includes said server domain machine certificate.

18. The system for secure computing as recited in claim 17, wherein said user identification carrier includes a plurality of memory devices, each of said plurality of memory devices inalterably storing thereon a second subset of said set of user credentials, each of said second subset of user credentials including a user identifier and said server domain user certificate.

19. The system for secure computing as recited in claim 18, wherein said user identifier is a personal identification number.

20. The system for secure computing as recited in claim 18, wherein said user identifier is user biometric data.

21. The system for secure computing as recited in claim 20, wherein said user biometric data is user fingerprint data.

22. The system for secure computing as recited in claim 20, wherein said user biometric data is user retinal scan data.

23. The system for secure computing as recited in claim 18, wherein each of said plurality of memory devices is respectively installed in a separate memory housing.

24. The system for secure computing as recited in claim 23, wherein said memory housing is a smart card.

25. The system for secure computing as recited in claim 14, wherein said server domain control server includes a group policy regulator for restricting access by the user to a distributed user storage volume on the at least one remote communication network, said distributed user storage volume containing user data.

26. The system for secure computing as recited in claim 25, wherein said group policy regulator further restricts storage of said user data to only said remote storage on said directory server.

27. The system for secure computing as recited in claim 26, wherein said group policy regulator further prohibits logical mapping of any non-volatile memory into said user storage volume.

28. The system for secure computing as recited in claim 14, wherein said client computing device further includes at least one virtual machine manager for creating at least one virtual machine executable on said embedded operating system, said at least one application service client being executed on a corresponding one of said at least one virtual machine.

29. The system for secure computing as recited in claim 28, wherein each of said at least one virtual machine manager is adapted to allocate memory from said local internal memory through said embedded operating system for executing therein a corresponding one of said at least one virtual machine, said allocated memory being isolated from memory allocated to any other one of said at least one virtual machine.

30. The system for secure computing as recited in claim 29, wherein each of said at least one virtual machine manager is adapted to prevent data transfer to said allocated memory from said memory allocated to any other one of said at least one virtual machine.

31. The system for secure computing as recited in claim 29, wherein said at least one virtual machine manager is adapted to erase said allocated memory upon said user identification carrier being de-coupled from said identification reader.

32. The system for secure computing as recited in claim 14, wherein said client domain network further includes a client domain filtering router for allowing transmission of:
  i) only network traffic of said predetermined type; and
  ii) only network traffic either:
    a) originating from said client domain network and directed toward said perimeter network; or
    b) originating from said perimeter network and directed toward said client domain network.

33. The system for secure computing as recited in claim 14, wherein communication between said client computing device and said client domain control server is conducted in accordance with a secure network protocol.

34. The system for secure computing as recited in claim 33, where said secure network protocol is Internet Protocol Security (IPSec).

35. The system for secure computing as recited in claim 14, wherein said virtual private network is operated under Layer Two Tunneling Protocol.

36. The system for secure computing as recited in claim 35, wherein network traffic over said virtual private network is encrypted in accordance with Advanced Encryption System (AES).

37. A system for secure computing between a user and a plurality of remote server networks, each of the plurality of remote server networks respectively assigned a corresponding security access level and the user assigned a set of access permissions corresponding to each of the plurality of remote server networks, the system comprising:
  a defense-in-depth architecture, including:
    a plurality of user identification cards, each of said plurality of user identification cards having respectively stored thereon an inalterable set of user credentials, each of said set of user credentials including a server domain user certificate issued from a corresponding one of the plurality of remote server networks and a user identifier;
    a client domain network including:
      a plurality of client computing devices for respectively providing to the user a corresponding interface to the secure computing system, each of said client computing devices including:
        a microprocessor, a network interface circuit and local internal memory;
        a set of machine credentials inalterably stored in said local internal memory, said set of machine credentials including a client domain machine certificate from said client domain network and a corresponding server domain machine certificate from each of the plurality of remote server networks to which said client computing device is allowed access;
      a plurality of identification readers for respectively retrieving said set of user credentials from a corresponding one of said plurality of user identification cards;
      a client domain services system coupled to said client computing device to receive said set of machine credentials therefrom and to authenticate said at least one client computing device to said client domain network upon successful authentication of said set of machine credentials, said client domain services system being prevented from remote access by entities outside said client domain network, wherein an access to said each remote server network is granted only upon successful authentication of both said set of machine credentials and set of user credentials;
      an embedded operating system inalterably stored in said local internal memory, said operating system including a set of operating parameters and prohibiting user access to said local internal memory by at least one of said operating parameters, wherein each of said plurality of client computing devices is adapted to prohibit alteration of said set of operating parameters by the user;
      a plurality of virtual private network clients executable on said embedded operating system, each of said virtual private network clients transmitting network traffic to, and receiving network traffic from, a corresponding one of the plurality of remote server networks over a corresponding virtual private network;
      a virtual machine monitor for creating a plurality of virtual machines executable on said embedded operating system, each of said plurality of virtual machines executing an application service session with a corresponding one of the plurality of remote server networks over said corresponding virtual private network, said application service session providing a user interface to a set of remotely executed computer applications located on said corresponding one of the plurality of remote server networks, access to said set of remotely executed computer applications being controlled in accordance with the set of access permissions assigned to the user for the corresponding one of the plurality of remote server networks, said virtual machine monitor adapted to allocate memory from said local internal memory through said embedded operating system for executing therein a corresponding one of said plurality of virtual machines, said allocated memory being isolated from memory allocated to any other one of said plurality of virtual machines; and a plurality of application service clients respectively executable on one of said plurality of virtual machines, each of said application service clients executing said corresponding application service session; and a perimeter network interposed between said client domain network and the plurality of remote server networks, said perimeter network configured to allow transmission of only network traffic of a predetermined type and prohibiting transmission of any network traffic bound to one of the plurality of remote server networks directly from any other one of the plurality of remote server networks;

a virtual private network gateway server respectively installed on each of the plurality of remote server networks for providing a terminus to said virtual private network corresponding therewith;

a server domain control server respectively installed on each of the plurality of remote communication networks for controlling access thereto in accordance with a combination of a corresponding server domain user certificate and a corresponding server domain machine certificate, said server domain control server being adapted to prohibit successful authentication of said client computing device to said at least one remote communication network if said client computing device is not authenticated by said client domain services system to said client domain network;

a directory server respectively installed on each of the plurality of remote server networks for providing remote storage user data, said user data accessible to the user in accordance with the set of access permissions assigned to the user for the corresponding one of the plurality of remote server networks, said directory server accessible to the user only through said virtual private network gateway server; and an application server installed on each of the plurality of remote communication networks for executing thereon user computer applications and for transmitting user interface data to, and receiving user input from, a corresponding one of said at least one application service client, said application server accessible to the user only through said virtual private network gateway server.

38. The system for secure computing as recited in claim 37, wherein said client domain network includes a certificate authority for issuing a client domain machine certificate to each of said plurality of client computing devices.

39. The system for secure computing as recited in claim 37, further comprising a certificate authority respectively installed on each of the plurality of remote server networks for respectively issuing said corresponding server domain user certificate to the user and said corresponding server domain machine certificate to each of said plurality of client computing devices allowed access to the corresponding one of the plurality of remote server networks.

40. The system for secure computing as recited in claim 37, wherein said server domain control server includes a group policy regulator for restricting access by the user to a distributed user storage volume on the corresponding one of the plurality of remote communication networks, said distribute user storage volume containing only said user computer applications and said user data.

41. The system for secure computing as recited in claim 40, wherein said group policy regulator further restricts storage of said user data to only said remote storage on said directory server of said corresponding one of the plurality of remote server networks.

42. The system for secure computing as recited in claim 41, wherein said group policy regulator further prohibits logical mapping of any non-volatile memory into said user storage volume.

43. The system for secure computing as recited in claim 37, wherein said virtual machine manager is adapted to prevent data transfer to memory allocated to one of said plurality of virtual machines from memory allocated to any other one of said plurality of virtual machines.

44. The system for secure computing as recited in claim 37, wherein said virtual machine manager is adapted to prevent data transfer to memory allocated to one of said plurality of virtual machines from memory allocated to any one of said plurality of virtual machines corresponding to one of the plurality of remote server networks having a security access level corresponding to stricter security requirements.

45. The system for secure computing as recited in claim 37, wherein said virtual machine monitor is adapted to erase said allocated memory for said corresponding virtual machine upon a corresponding one of said plurality of user identification cards being decoupled from said identification reader.

46. The system for secure computing as recited in claim 37, wherein said client domain network further includes a client domain filtering router for allowing transmission of:
 i) only network traffic of said predetermined type; and
 ii) only network traffic either:
  a) originating from said client domain network and directed toward said perimeter network; or
  b) originating from said perimeter network and directed toward said client domain network.

47. The system for secure computing as recited in claim 37, wherein communication between each of said plurality of client computing devices and said client domain control server is conducted in accordance with a secure network protocol.

48. The system for secure computing as recited in claim 47, where in said secure network protocol is Internet Protocol Security (IPSec).

49. The system for secure computing as recited in claim 37, wherein said virtual private network corresponding to said application session is operated under Layer Two Tunneling Protocol.

50. The system for secure computing as recited in claim 49, wherein network traffic over said virtual private network corresponding to said application session is encrypted in accordance with Advanced Encryption Standard (AES).

* * * * *